United States Patent
Koppisetty et al.

(10) Patent No.: US 12,447,778 B2
(45) Date of Patent: Oct. 21, 2025

(54) SYSTEM AND METHOD FOR ADAPTIVE TIRE PRESSURE CONTROL

(71) Applicant: Volvo Car Corporation, Gothenburg (SE)

(72) Inventors: Ashok Chaitanya Koppisetty, Gothenburg (SE); Egoi Sanchez Basualdo, Gothenburg (SE); Xingyun Yang, Gothenburg (SE); Kostas Chatziioannou, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 129 days.

(21) Appl. No.: 18/392,504

(22) Filed: Dec. 21, 2023

(65) Prior Publication Data
US 2025/0206073 A1    Jun. 26, 2025

(51) Int. Cl.
*B60C 23/00* (2006.01)
*B60C 23/04* (2006.01)

(52) U.S. Cl.
CPC ........ *B60C 23/002* (2013.01); *B60C 23/0488* (2013.01); *B60C 23/0489* (2013.01)

(58) Field of Classification Search
CPC .............. B60C 23/002; B60C 23/0488; B60C 23/0489
See application file for complete search history.

(56) References Cited

U.S. PATENT DOCUMENTS

| | | | |
|---|---|---|---|
| 6,594,566 B1* | 7/2003 | Skoff | B60C 23/002 701/33.9 |
| 10,059,155 B2 | 8/2018 | Hoeldrich et al. | |
| 10,144,253 B2 | 12/2018 | Mays et al. | |
| 10,434,827 B2 | 10/2019 | Tomakidi | |
| 10,449,814 B2 | 10/2019 | Foor | |
| 10,596,868 B2 | 3/2020 | Mancinelli et al. | |
| 10,611,198 B2 | 4/2020 | Toth et al. | |
| 10,661,615 B2 | 5/2020 | Tomakidi | |
| 11,433,719 B1 | 9/2022 | Weston et al. | |
| 2013/0030658 A1* | 1/2013 | Linster | B60C 23/10 701/48 |
| 2013/0184931 A1* | 7/2013 | Boss | G06F 7/00 701/36 |
| 2013/0198031 A1 | 8/2013 | Mitchell et al. | |
| 2015/0174972 A1* | 6/2015 | Zhou | B60C 23/00345 340/447 |

(Continued)

FOREIGN PATENT DOCUMENTS

| | | |
|---|---|---|
| EP | 2664466 A2 | 11/2013 |
| GB | 2571984 A | 9/2019 |

(Continued)

*Primary Examiner* — Ramsey Refai
(74) *Attorney, Agent, or Firm* — Raj S. Dave; Dave Law Group LLC

(57) ABSTRACT

Embodiments relates to systems and methods to calculate a tire pressure scheme to be utilized by a tire of a vehicle during a trip, communicate a command to the tire pressure control apparatus, to adjust tire pressure of a tire based on the tire pressure scheme, detect a problem encountered in adjusting the tire pressure of the tire based on the tire pressure scheme, generate an alert regarding the problem via a driver assistance interface, and recommend an action to be taken to mitigate the problem.

20 Claims, 21 Drawing Sheets

---

→ 800a

CALCULATING A TIRE PRESSURE SCHEME TO BE UTILIZED BY A TIRE OF A VEHICLE DURING A TRIP 802a

↓

COMMUNICATING A COMMAND TO THE TIRE PRESSURE CONTROL APPARATUS, TO ADJUST TIRE PRESSURE OF A TIRE BASED ON THE TIRE PRESSURE SCHEME 804a

↓

DETECTING A PROBLEM ENCOUNTERED IN ADJUSTING THE TIRE PRESSURE OF THE TIRE BASED ON THE TIRE PRESSURE SCHEME 806a

↓

GENERATING AN ALERT REGARDING THE PROBLEM ENCOUNTERED 808a

↓

RECOMMENDING AN ACTION TO BE TAKEN TO MITIGATE THE PROBLEM 810a

(56) References Cited

U.S. PATENT DOCUMENTS

2022/0371385 A1    11/2022  McNaught
2023/0044053 A1*    2/2023  Moetteli ................. B60C 23/10
2023/0191856 A1     6/2023  Hrabal

FOREIGN PATENT DOCUMENTS

| WO | 2003049958 A1 | 6/2003 |
| WO | 2017127394 A1 | 7/2017 |
| WO | 2018010874 A1 | 1/2018 |
| WO | 2019173611 A1 | 9/2019 |
| WO | 2023039629 A1 | 3/2023 |

\* cited by examiner

| Message Type | Message Protocol Example | Explanation |
|---|---|---|
| Basic Safety Message (BSM) format: | Header:<br>Message ID: 0x20<br>Protocol version: 1<br>Data:<br>Vehicle ID: 0x1234<br>Speed: 60 mph<br>Heading: 180 degrees<br>Latitude: 37.7749 degrees<br>Longitude: -122.4194 degrees<br>Timestamp: 0x12345678 | This message is a BSM that includes information about a vehicle with ID 0x1234, traveling at a speed of 60 mph in the direction of 180 degrees. The latitude and longitude coordinates indicate the vehicle's position, and the timestamp indicates when the message was generated. |
| Route characteristic (RC) format: | Header:<br>Message ID: 0x0A<br>Protocol version: 1<br>Data:<br>Vehicle ID: 0x1234<br>St. pt:<br>Heading: 180 degrees<br>RouteCharacteristic("Example Route", 50.5, 2.5, 34.0522, -118.2437, 37.7749, -122.4194) route.display_route_details<br>Alert type: Pressure change parameters | - Starting Point<br>- Destination<br>- Route Characteristics:<br>[Noteworthy aspects of the route, such as terrain, weather conditions, etc.] |
| Tire scheme (TS) format: | Header:<br>Message ID: 0x0B<br>Protocol version: 1<br>Data:<br>location = LocationProvider (34.0522, -118.2437)<br>tire1 = TirePressureSensor("Front Left", 32, 25, 750)<br>tire2 = TirePressureSensor("Front Right", 33, 26, 760)<br>tire3 = TirePressureSensor("Rear Left", 31, 24, 730)<br>tire4 = TirePressureSensor("Rear Right", 30, 27, 770)<br>Alert type: Tire pressure scheme | - Pre-Trip Preparation<br>- Temperature Adjustment<br>- Altitude Adjustment<br>- Load Variation<br>- Routine Checks<br>- Emergency Preparedness<br>- Record Keeping |

FIG. 15

SYSTEM AND METHOD FOR ADAPTIVE TIRE PRESSURE CONTROL

FIELD OF THE INVENTION

The present disclosure relates to adaptive tire pressure management systems. More specifically, the present disclosure relates to systems and methods for optimizing and maintaining tire pressure based on various factors, including routing information, weather conditions, driver habits, and energy information.

BACKGROUND

Contemporary technology lacks the capability to dynamically adjust tire pressure based on varying weather or road conditions. When confronted with the necessity of navigating hazardous routes owing to inclement weather or road hazards, drivers are forced to either adapt their driving behavior or seek alternative routes, often leading to time-consuming delays. This approach becomes even more problematic in emergency scenarios where time is of the essence. Thus, an imperative exists for the development of an adaptive tire pressure modification system, enabling drivers to confidently opt for their chosen routes without compromising safety, efficiency, or urgency.

Therefore, there is a need for optimizing and maintaining tire pressure based on various factors, including routing information, weather conditions, driver habits, and energy information.

SUMMARY

The following presents a summary to provide a basic understanding of one or more embodiments described herein. This summary is not intended to identify key or critical elements or delineate any scope of the different embodiments and/or any scope of the claims. The purpose of the summary is to present some concepts in a simplified form as a prelude to the more detailed description presented herein.

An embodiment relates to a system comprising: a tire pressure control apparatus, a processor comprising a monitoring module, a routing module, and a tire pressure module, and a memory coupled to the processor, the memory comprising instructions executable by the processor to calculate a tire pressure scheme to be utilized by a tire of a vehicle during a trip, communicate a command to the tire pressure control apparatus, to adjust tire pressure of a tire based on the tire pressure scheme, detect a problem encountered in adjusting the tire pressure of the tire based on the tire pressure scheme, generate an alert regarding the problem via a driver assistance interface, and recommend an action to be taken to mitigate the problem.

Another embodiment relates to a method, the method comprising calculating a tire pressure scheme to be utilized during a trip, communicating a command to a tire pressure control apparatus to adjust tire pressure of a tire based on the tire pressure scheme, detecting a problem encountered in adjusting the tire pressure of the tire based on the tire pressure scheme, generating an alert regarding the problem via a driver assistance interface, and recommending an action to be taken to mitigate the problem.

Yet another embodiment relates to a non-transitory computer-readable medium for managing tire pressure of a tire associated with a vehicle, the non-transitory computer-readable medium comprising instructions executed to calculate a tire pressure scheme to be utilized during a trip, communicate a command to a tire pressure control apparatus to adjust tire pressure of the tire based on the tire pressure scheme, detect a problem encountered in adjusting the tire pressure of the tire based on tire pressure scheme, generate an alert regarding the problem via a driver assistance interface, and recommend an action to be taken to mitigate the problem.

BRIEF DESCRIPTION OF THE FIGURES

These and other aspects of the present invention will now be described in more detail, with reference to the appended drawings showing exemplary embodiments of the present invention, in which:

FIG. 15 shows example messages in Dedicated Short-Range Communications (DSRC) message format according to an embodiment.

Figure 1A:
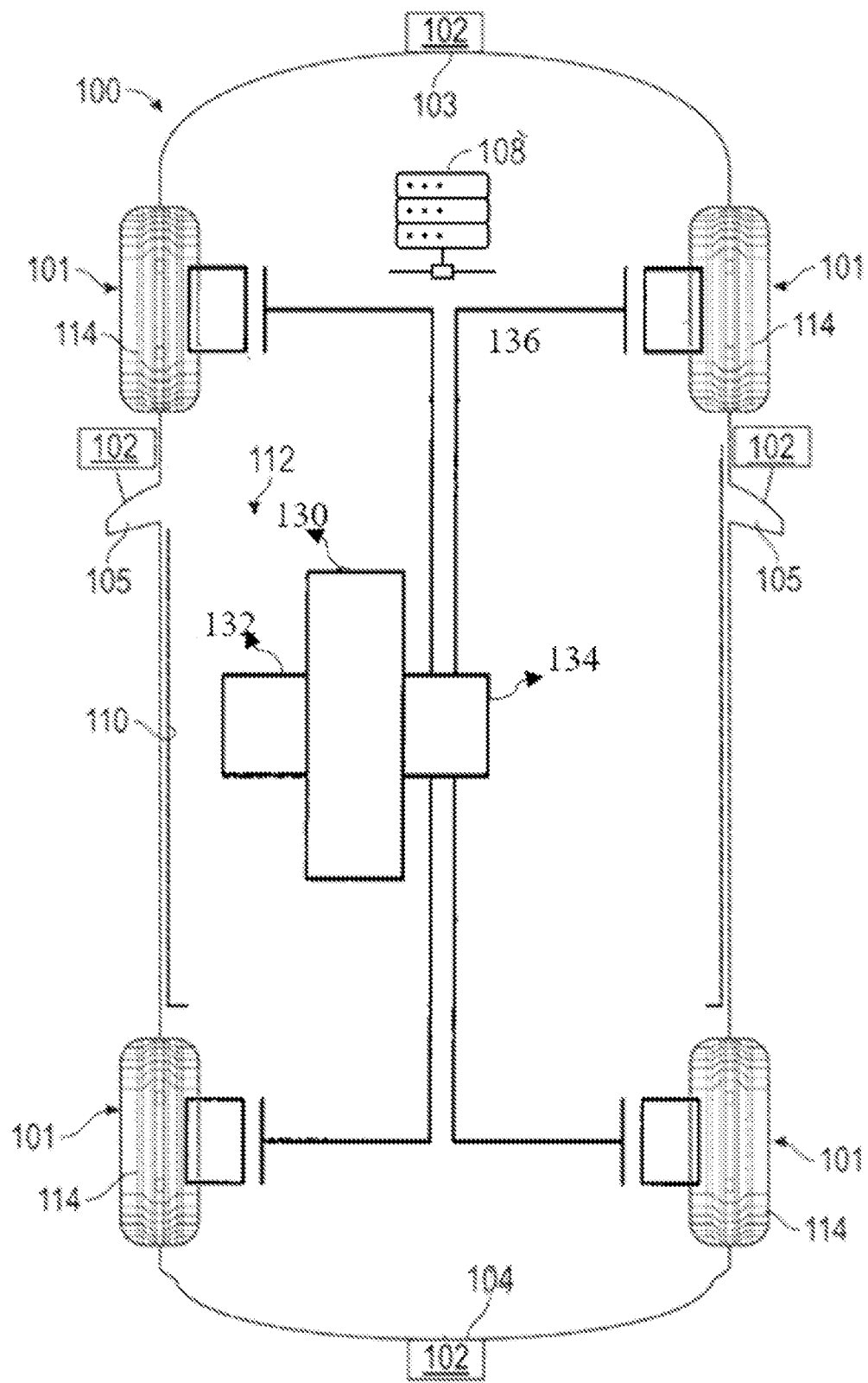
FIG. 1A provides a schematic plan view of a vehicle comprising a tire pressure control apparatus, according to one or more embodiments.

Other features of the present embodiments will be apparent from the accompanying drawings and from the detailed description that follows.

DETAILED DESCRIPTION

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve the understanding of the embodiments of the present disclosure. The same reference numeral in different figures denotes the same element.

Although the detailed description herein contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more." Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein the term "component" refers to a distinct and identifiable part, element, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

Digital electronic circuitry, or computer software, firmware, or hardware, including the structures disclosed in this specification and their structural equivalents, or in combinations of one or more of them may realize the implementations and all of the functional operations described in this specification. Implementations may be as one or more computer program products, i.e., one or more modules of computer program instructions encoded on a computer-readable medium for execution by, or to control the operation of, data processing apparatus. The non-transitory computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc., may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network, may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship with each other.

Embodiments of the present invention may comprise or utilize a special purpose or general purpose computer including computer hardware. Embodiments within the scope of the present invention may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinct kinds of computer-readable media: physical computer-readable storage media and transmission computer-readable media.

Although the present embodiments described herein are with reference to specific example embodiments, it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media can include a network and/or data links which carry desired program code in the form of computer-executable instructions or data structures. The scope of computer-readable media includes combinations of the above, that enable the transport of electronic data between computer systems and/ or modules and/or other electronic devices. The term network may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multiprocessor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The following terms and phrases, unless otherwise indicated, shall be understood to have the following meanings.

As used herein, the term "Cryptographic protocol" is also known as security protocol or encryption protocol. It is an abstract or concrete protocol that performs a security-related function and applies cryptographic methods often as sequences of cryptographic primitives. A protocol describes usage of algorithms. A sufficiently detailed protocol includes details about data structures and representations, to implement multiple, interoperable versions of a program.

Secure application-level data transport widely uses cryptographic protocols. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation.

Networking switches use cryptographic protocols, like Secure Socket Layer (SSL) and Transport Layer Security (TLS), the successor to SSL, to secure data communications over a wireless network.

As used herein, "Tires loaded on the vehicle" refers to the set of tires that are currently mounted and actively in use on the vehicle for regular operation, including those that support its weight, provide traction, and are utilized during normal driving conditions.

As used herein, "optimal tire pressure" refers to an ideal tire pressure of a vehicle's tires to ensure safe and efficient operation of the vehicle. Maintaining proper tire pressure helps in optimal traction and control, reducing the risk of accidents, especially during sudden maneuvers or adverse weather conditions. Under-inflated tires can increase rolling resistance, leading to reduced fuel efficiency, while over-inflated tires can increase fuel efficiency but compromise the controlling and maneuvering of the vehicle. Incorrect tire pressure can result in uneven tire wear, shortening the lifespan of the tires and necessitating premature replacements. Maintaining the correct tire pressure ensures stable handling and a comfortable ride, enhancing the overall driving experience.

As used herein, "tire pressure scheme", refers to a plan for managing and maintaining tire pressure throughout a trip or journey to maximize safety, performance, and efficiency. This scheme involves steps and considerations to ensure that the vehicle's tires are at the right pressure levels during the trip.

As used herein, "energy information" refers to data related to the consumption, generation, and distribution of energy within the vehicle, encompassing aspects such as fuel consumption, battery consumption, battery state, and power usage. For tire pressure management, this is important because it helps make sure the tires have the right pressure, which affects how much fuel the vehicle uses and how much energy it needs.

As used herein, "weather condition" or "environment condition" refers to the atmospheric state and environmental elements, such as temperature, humidity, precipitation, wind, and visibility, that collectively define the current state of the atmosphere in a particular location. In the context of tire pressure management, weather conditions are significant because they can affect tire pressure. For instance, temperature fluctuations can lead to changes in tire pressure, making it essential to monitor and adjust tire pressure accordingly to ensure safe and efficient vehicle operation.

As used herein, "inertial navigation" refers to a technology that enables a vehicle to determine its position, orientation, and velocity based on data from accelerometers and gyroscopes, providing navigation without reliance on external signals.

As used herein, a "radio frequency system" refers to an integrated component within a vehicle's communication infrastructure, allowing for wireless data transmission, remote keyless entry, and vehicle-to-vehicle communication.

As used herein, a "navigation system" refers to a built-in or an external system that assists drivers in route planning, real-time mapping, and providing turn-by-turn directions during travel.

As used herein, an "infotainment system" combines information and entertainment features within a vehicle, encompassing multimedia, navigation, communication, and vehicle control through a centralized interface.

As used herein, "adaptive cruise control system" refers to an advanced driver assistance technology that automatically adjusts a vehicle's speed to maintain a safe following distance from the vehicle ahead.

As used herein, a "telematics control unit" refers to a component that collects and transmits vehicle data, facilitating services like remote diagnostics, emergency assistance, and tracking.

As used herein, an "autonomous driving system" refers to a technology that enables a vehicle to operate without human intervention, with the capability to navigate, control speed, and make driving decisions autonomously.

As used herein, a "battery management system" refers to an integral part of electric vehicles that monitors and manages the health, performance, and charging of the vehicle's battery pack.

As used herein, an "engine control system" refers to elements that regulate engine functions such as fuel injection, ignition, and emissions to optimize performance, fuel efficiency, and emissions.

As used herein, a "transmission control system" refers to the system that governs gear shifts, torque distribution, and power delivery in a vehicle's transmission, enhancing driving performance and efficiency.

As used herein, "log" refers to a digital record that tracks vehicle maintenance and service history, assisting in timely maintenance and troubleshooting.

As used herein, "driving habits" encompass a driver's typical behavior, preferences, and driving patterns, which can influence vehicle performance, fuel efficiency, and safety.

As used herein, "energy efficiency" refers to the ability of a vehicle to use less energy to provide the same level of service or result.

As used herein, a "structural flaw" refers to any defect or issue in a product or material that may compromise safety and performance.

As used herein, "driving mode" refers to an operational setting or configuration that a vehicle can be set to, typically influencing the vehicle's performance characteristics, such as engine power, transmission behavior, and suspension settings. Different driving modes are often designed to suit specific driving conditions or preferences. Some common types of driving modes found in vehicles are normal mode, eco mode, sport mode, snow/winter mode, off-road mode, tow/haul mode, electric mode (hybrid/plug-in hybrid), EV (electric vehicle) mode, comfort mode, individual/custom mode. The availability of these driving modes may vary by the make and model of the vehicle, with more advanced and luxury vehicles often offering a wider range of mode options.

As used herein, "roadway manager" refers to a system or component that employs data analysis and algorithms to determine a path from a starting point to a destination. Roadway manager may provide an optimal path by optimizing factors such as travel time, fuel consumption, and convenience.

As used herein, a "route" refers to a path connecting any two geographic locations. Route can be planned or unplanned/spontaneously determined.

As used herein, conditions of the route can include any or some combination of the following: a length of the route (e.g., long-haul versus short-haul), a temperature condition (the external temperature of the environment of the vehicle), a weather condition (e.g., rainy, dry, snowy, icy, etc.), a vehicular traffic condition of a road along the route, a load condition (the expected load, in terms of an amount of cargo and/or number of people that the vehicle is expected to carry in a respective route segment), a terrain (e.g., hilly or mountainous terrain, flat terrain, rough terrain, smooth terrain, etc.), a road type (e.g., city road or highway road, etc.), and so forth.

As used herein, "optimal route" refers to a most efficient path to reach a destination, taking into account various factors such as distance, travel time, traffic conditions, road quality, and personal preferences.

To determine the optimal route, the routing module may utilize GPS navigation apps and take into consideration real-time traffic data and other factors to provide the best route based on specific needs and preferences.

The determination of the conditions of a route can be based on information from various information sources accessible by a roadway manager. It is to be noted that the conditions of the route, or a route segment, can change with time. For example, during rush hour, a road segment through a city may be congested with traffic, while during late night or early morning hours, the road segment may have light traffic.

Examples of the information sources accessible locally by the roadway manager or over a network include one or more of: a weather site that provides weather information by geographic locations, a traffic site or online map that provides traffic information (including any traffic incidents such as vehicular accidents or stalls) along roads, a data repository containing information describing terrains of roads (e.g., the type of road, such as paved or unpaved road, the slope of the road, the elevation of the road, a city road, a highway road, a road with many traffic lights or stop signs, a toll road, etc.), a data repository containing information regarding where cargo or people are to be dropped off or picked up by the vehicle, and so forth.

In further examples, some or all of the information sources can be integrated into fewer or even a single information source.

As used herein, "Tire pressure relevant parameter sets" for a vehicle refers to the various factors and variables that influence and are influenced by the tire pressure of a vehicle. The non limiting examples of Tire pressure relevant parameter sets are vehicle load, load distribution, road conditions, ambient temperature, altitude, driving habits, driving style, tire size, tire type, manufacturers recommendations, tire wear, and tire age. These parameter sets interact and affect each other, and the optimal tire pressure for a specific vehicle and driving scenario is often a balance, or compromise, between these factors.

As used herein, the term "performance" or "tire performance" refers to the overall capabilities and characteristics of a tire when it is used on a vehicle. It encompasses a range of factors such as traction, handling, braking, comfort, durability, tread life, load carrying capacity etc.

As used herein, the term "handling" refers to the tire's response in controlling the vehicle's stability during maneuvers and steering inputs. Tires with responsive handling characteristics provide a more precise and controlled driving experience.

As used herein, the term "Unauthorized access" is when someone gains access to a website, program, server, service, or other system using someone else's account or other methods. For example, if someone kept guessing a password or username for an account that was not theirs until they gained access, it is considered unauthorized access.

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. For example, the computer readable storage medium can be, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, does not construe transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein are downloadable to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages. Programming languages may be high-level programming languages, low-level programming languages, compiled languages, interpreted languages, scripting languages, functional programming languages, markup languages, etc. It includes object oriented programming languages such as Smalltalk, C++, or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. Each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustrations, and/or combinations of blocks in the block diagrams and/or flowchart illustrations, can be implemented by special purpose hardware-based systems that can perform the specified functions and/or acts and/or carry out one or more combinations of special purpose hardware and/or computer instructions.

While the subject matter described herein is in the general context of computer-executable instructions of a computer program product that runs on a computer and/or computers, those skilled in the art will recognize that the one or more embodiments herein also can be implemented in combination with one or more other program modules. Program modules include routines, programs, components, data structures, and/or the like that perform particular tasks and/or implement particular abstract data types. Moreover, other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like can practice the herein described computer-implemented methods. Distributed computing environments, in which remote processing devices linked through a communications network perform tasks, can also practice the illustrated aspects. Stand-alone computers can practice one or more, if not all aspects of the one or more embodiments described herein. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

As it is employed in the subject specification, the term "processor" can refer to any computing processing unit and/or device comprising, but not limited to, single-core processors; single-processors with software multi-thread execution capability; multi-core processors; multi-core processors with software multi-thread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A combination of computing processing units can implement a processor.

Herein, terms such as "store," "storage," "data store," data storage," "database," and any other information storage component relevant to operation and functionality of a component refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random access memory (RAM) (e.g., ferroelectric RAM (FeRAM). Volatile memory can include RAM, which can function as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synch link DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein include, without being limited to including, these and/or any other suitable types of memory.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

Other specific forms may embody the present invention without departing from its spirit or characteristics. The described embodiments are in all respects illustrative and not restrictive. Therefore, the appended claims rather than the description herein indicate the scope of the invention. All variations which come within the meaning and range of equivalency of the claims are within their scope.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

An embodiment relates to a system comprising a tire pressure control apparatus, a monitoring module, a tire pressure module, and a processor storing instructions in non-transitory memory that, when executed, cause the processor to receive data from the monitoring module wherein the data comprises a first tire pressure of a tire of a vehicle and a weather condition and a road condition, determine by the tire pressure module a second tire pressure of the tire based on the weather condition and the road condition, determine a requirement for adjustment of the first tire pressure to the second tire pressure for the tire, and communicate a command to the tire pressure control apparatus for adjusting the first tire pressure to the second tire pressure.

The system continuously monitors one or more of road conditions, driving habits, driving mode, available fuel/charge, and other factors to determine a current tire pressure and adjusts to an optimal tire pressure during a trip/journey to maximize safety, performance, and efficiency. The system is designed to dynamically inflate and/or deflate tires of a vehicle, based on vehicle operating conditions, road condition and weather condition to reduce tire wear and/or to enhance efficiency, performance, and safety.

In an embodiment, the tire pressure management system is utilized with a vehicle. The tire pressure management system described herein may have applications in vehicles for both light and heavy duty and for passenger, commercial, and off-highway vehicles. Furthermore, it would be understood by one of ordinary skill in the art that the tire pressure management system could have industrial, locomotive, military, and aerospace applications.

In some embodiments, the system identifies when tire pressure adjustments are needed based on one or more of a change in road condition, a change in weather condition, driving habits, and available energy/fuel information. The system can both inflate and deflate tires via the tire pressure control apparatus while the vehicle is stationary or in motion. For instance, in typical scenarios, when dealing with uneven road surfaces that may lead to tire skidding, a system could modify tire pressure, either increasing or decreasing it, to manage the contact area of the tires with the road surface. This adjustment aims to compensate for the challenging road conditions until a smoother road surface becomes available. In the case of a curvy road, a system in typical situations might utilize data from a multi-axis accelerometer to gauge the road's degree of curvature and then adapt the tire pressure accordingly. This adjustment could involve increasing tire pressure to reduce tire wear or decreasing it within a specified range to enhance traction. These adjustments are made on a per-tire or per-wheel basis. In these example scenarios, a default condition might be established for roads that are straight, smooth, and not slippery, with tire pressure dynamically tuned to optimize the contact area based on the load, as previously explained. In an embodiment, the processor of the system is operable to adjust the first tire pressure of the tire to the second tire pressure via the tire pressure control apparatus.

In another embodiment, the second tire pressure is an optimal tire pressure recommended based on at least one of the road condition, the weather condition, a planned route, a forecasted weather conditions, a change in driving habit, a change in driving mode, a wear condition of the tire, a load on the vehicle, a safety consideration, and a fuel efficiency consideration.

In yet another embodiment, the tire comprises any one of the tires mounted on the vehicle.

In yet another embodiment, the tire comprises any one of the tires loaded on the vehicle.

In yet another embodiment, the data further comprises route information, driving habit, driving mode, and energy information.

In yet another embodiment, the monitoring module is in communication with a measuring device.

In yet another embodiment, the measuring device comprises one or more sensors.

In yet another embodiment, the one or more sensors comprises a position sensor, an accelerometer, a gyroscope, a magnetometer, a pressure sensor, a temperature sensor, an occupancy sensor, a mass airflow sensor, an engine speed sensor, a spark knock sensor, a coolant sensor, a fuel temperature sensor, a voltage sensor, a camshaft position sensor, a throttle position sensor, a camera, and a microphone.

In yet another embodiment, the one or more sensors are operable to send signals to the processor.

In yet another embodiment, the monitoring module is operable to interrogate and receive the data from the measuring device using a wireless communication technology.

In yet another embodiment, the monitoring module is operable to interrogate and receive the data from the measuring device using wired communication technology.

In yet another embodiment, the position sensor comprises a Global Positioning System (GPS).

In yet another embodiment, the position sensor comprises an inertial navigation sensor. The inertial navigation sensor can measure the vehicle's acceleration and deceleration, can detect lateral movements, such as during turns or lane changes, and can identify the type of terrain the vehicle is driving on, such as smooth roads, rough terrain, or slippery surfaces. By analyzing this data, the system can adjust tire pressure to enhance traction, stability, and fuel efficiency. Also, inertial navigation sensors can be used to estimate the dynamic load on each tire during different driving conditions. Adjusting tire pressure based on load variations can help distribute the load more evenly, enhancing tire life and performance.

In yet another embodiment, the pressure sensor is located on a wheel and is configured for wirelessly transmitting tire pressure data when interrogated by the processor.

In yet another embodiment, the monitoring module is further operable to receive vehicle information from other computing devices of the vehicle.

In yet another embodiment, the vehicle information comprises one or more of GPS coordinates, map data, route information, real-time traffic data, vehicle speed, distance to other vehicles, radar or sensor data, vehicle diagnostics, location data, driver behavior information, battery status, voltage, current, temperature, state of charge (SoC), state of health (SoH), and transmission control data.

In yet another embodiment, the processor is operable to create a log of one or more of the command, the first tire pressure, the second tire pressure, the weather condition, and the road condition after the first tire pressure is adjusted to the second tire pressure.

In yet another embodiment, the processor is operable to send a modification command to the tire pressure control apparatus to generate the corrective tire pressure based on an expected weather condition of the future location of the vehicle.

In yet another embodiment, the processor is operable to send a modification command to the tire pressure control apparatus to generate the corrective tire pressure based on an expected road condition of the future location of the vehicle.

In yet another embodiment, the processor is operable to communicate with the tire pressure control apparatus via at least one of a wireless communication technology means and a wired communication technology means.

In yet another embodiment, the system is operable to inflate the tire while the vehicle is in motion.

In yet another embodiment, the system is operable to deflate the tire while the vehicle is in motion.

In yet another embodiment, the system is operable to inflate the tire while the vehicle is stationary.

In yet another embodiment, the system is operable to deflate the tire while the vehicle is stationary.

In yet another embodiment, the system further comprises a communication module.

In yet another embodiment, the communication module is operable to receive messages from the system.

In yet another embodiment, the command is sent to the tire pressure control apparatus via the communication module.

In yet another embodiment, the tire recommended pressure adjustments are made in real-time throughout a trip.

In yet another embodiment, the processor is further operable to determine a suitable location along the trip for the tire recommended pressure adjustments.

In yet another embodiment, the processor is further operable to track a location of the vehicle.

In yet another embodiment, the processor is further operable to send a message to the tire pressure control apparatus to adjust tire pressure before reaching specific locations where adjustments are needed.

In yet another embodiment, the processor is further operable to provide a user with reports displayed on a graphical interface located in the vehicle.

In yet another embodiment, the processor is further operable to transmit at least one of the reports and vehicle data to a remote receiving unit.

In yet another embodiment, the remote receiving unit can be one of a computer, a server, a handheld receiver, a network, internet, and a combination thereof.

In yet another embodiment, the reports and the vehicle data are analyzed for proactive maintenance, safety assessments, and performance optimization.

In most cases, air compressors used for inflating or deflating tires do have regulators to control the air flow. This regulation helps ensure that the tire is inflated to the desired pressure without over-inflating, which can be harmful to the tire. As for the monitoring of tire pressure, it is generally done during the inflation process to ensure that the desired pressure is reached. It is essential to monitor the pressure to prevent over-inflation or under-inflation, as both can affect tire performance and safety. However, the monitoring process is designed to avoid causing any structural flaws in the tire. If a structural flaw were to be detected or suspected during the tire pressure control process, it is crucial to address it promptly. Structural flaws can lead to tire failure and safety hazards. In an embodiment, a regular tire maintenance schedule, including inspections for structural flaws, is recommended to ensure safe and efficient driving.

In an embodiment, the processor is further operable to measure a rate of air flow that the tire pressure control apparatus is inserting into the tire during a predetermined time period.

In another embodiment, the processor is further operable to determine whether there is a structural flaw with the tire based on the rate of the air flow.

In yet another embodiment, the processor is further operable to issue an alert to a user that indicates the structural flaw with the tire when the rate of air flow exceeds a threshold during the predetermined time period.

In yet another embodiment, the tire pressure control apparatus is operable to adjust the first tire pressure for any one, any combination, or all of a specific wheel, an axle, and overall tire pressure.

In an example, tire pressure relevant parameter sets can be selected for adjusting the tire pressure. These parameter sets help determine the appropriate tire pressure settings for optimal performance, safety, and fuel efficiency. The non limiting examples of Tire pressure relevant parameter sets are vehicle load, load distribution, road conditions, ambient temperature, altitude, driving habits, driving style, tire size, tire type, manufacturers recommendations, tire wear, and tire age. These parameter sets interact and affect each other, and the optimal tire pressure for a specific vehicle and driving scenario is often a balance, or compromise, between these factors. The tire pressure relevant parameter sets from which the roadway manager can select can be stored in a data repository locally or remotely accessible by the roadway manager. The tire pressure relevant parameter sets may have been developed by an enterprise that operates the roadway manager, or alternatively, the tire pressure relevant parameter sets may be provided by a third-party enterprise.

In yet another embodiment, the system further comprises a driver assistance interface. The driver assistance interface is operable to autonomously ascertain one or more tire pressure relevant parameter sets and an optimization target variable. The one or more tire pressure relevant parameter sets, and the optimization target variable are used to set the order to implement a tire pressure scheme. The tire pressure scheme is then communicated to the tire pressure control apparatus.

In yet another embodiment, the driver assistance interface is designed based on a data cloud service. The driver assistance interface based on a data cloud service offers the advantages of efficient data management, scalability, real-time access, and cost savings. It allows for more advanced and flexible driver assistance features while addressing the data processing and storage requirements of modern vehicles.

In yet another embodiment, the driver assistance interface comprises a mobile data transmission device. The mobile data transmission device enables real-time connectivity, data transfer, remote monitoring, and a wide range of features that enhance the safety, functionality, and efficiency of the driver assistance system.

In some embodiments, the system collects data from other vehicles on the desired route to determine optimal tire pressure at the start of the trip. It calculates tire pressure requirements for the entire trip and adapts to changing road conditions during the trip.

In some embodiments, the tire pressure is adjusted continuously, and the system determines where on the road these adjustments should be made. It can send alerts to the driver in advance of adjustment points and can dynamically recalculate the tire pressure scheme based on real-time conditions.

In some embodiments, the system monitors road conditions within a predetermined range from the vehicle for the entire trip. It uses this data to adaptively optimize tire pressure for performance, fuel efficiency, and safety. It can also alert the driver if issues arise.

In some embodiments, the users can input preferences like driving mode (e.g., tour mode or sport mode). The system can recommend a tire pressure scheme based on these preferences and can adapt based on a change in weather conditions and road conditions.

Tire rotation is a regular maintenance procedure that involves moving the vehicle's tires from one position to another on the vehicle. Common rotation patterns include front-to-back, side-to-side, or diagonal rotations. The purpose of tire rotation is to promote even tire wear.

In some embodiments, the system considers tire conditions and wear levels. It can recommend tire rotation or replacement based on tire wear. It monitors tire performance and may suggest route or driving habit modifications for safety.

In some embodiments, the system can receive and share tire pressure data, load information, speed, etc. with nearby vehicles to modify its own tire pressure scheme as needed.

In some embodiments, the system utilizes various information received via tire friction, slippage data, and speed from various sensors, to determine if tire pressure adjustments are necessary for performance, fuel efficiency, or safety. In an embodiment, any adaptive scheme can override pre-calculated schemes.

Referring to FIG. 1A, it provides a schematic plan view of a vehicle 100 comprising a tire pressure control apparatus 108, according to one or more embodiments. The vehicle 100 includes a body 110 that is arranged on a chassis 112. The body 110 substantially encloses other components of the vehicle 100. The body 110 and the chassis 112 may jointly form a frame. The vehicle 100 also includes a plurality of wheels 101 having tires 114. The tires 114 are each rotationally coupled to the chassis 112 near a respective corner of the body 110 to facilitate movement of the vehicle 100. In one embodiment, the vehicle 100 includes four tires 114, although this may vary in other embodiments. The vehicle comprises sensors mounted all around and inside the vehicle. In the depicted embodiment, separate cameras 102 are mounted on a front portion 103 of the body 110 (e.g., a front fascia of the vehicle 100), a rear portion 104 of the body 110 (e.g., a rear fascia of the vehicle 100), and on side mirrors 105 of the vehicle 100. It will be appreciated that in various embodiments cameras may also be mounted elsewhere on the body 110 of the vehicle 100.

In an embodiment, the vehicle comprises a tire pressure control apparatus that is designed to inflate and/or deflate a tire, based on vehicle operating conditions, to reduce tire wear, to enhance performance, and to increase safety. The tire pressure control apparatus comprises a compressor 132 connected to, such as in fluid communication with an air supply tank 130. An air line 136, is running uninterrupted from the air supply tank 130 (and regulator 134) to the plurality of wheels 101. In some embodiments, at least one air line 136 extends from the regulator 134 to each wheel. Notably, these air lines are operable to ensure an uninterrupted flow of air, devoid of obstructions like walls, solenoids, or other mechanical devices. This design provides a dedicated, direct connection from the tank's regulator 134 to each wheel 101, allowing for the efficient transmission of pressurized air to the tires 114. These air lines 136 are required to be capable of conveying pressurized air from the regulator 134 to their respective wheels 101. Typically, these air lines 136 are robust and of substantial size, engineered to withstand not only air pressure but also the rigors of outdoor environments. Each air line 136 extends to a rotatory joint located at the wheel. More specifically, the air line connects with the stationary portion of this rotatory joint. The rotatory joint comprises both a stationary portion and a rotating portion, sealed by at least one rotatory seal. The weight of the air line or other means may immobilize the stationary portion, preventing it from rotating. Consequently, the stationary portion is held in place, diffusing and absorbing any potential rotational forces. Additionally, the stationary portion may be secured by attaching it to a portion of the vehicle chassis. The rotating portion is situated on a rotating hub and may be fastened to this hub, often through a bracket or similar mechanism. The hub is turned by its connection to an axle, which, in turn, is connected to a source of rotation, including but not limited to a differential. The hub provides the necessary support for one or more tires. The two components of the rotatory joint collaborate to facilitate the transfer of pressurized air from the upstream stationary portion to the downstream rotating portion without allowing any air to escape. Furthermore, a pneumatic control unit is positioned at each wheel and comprises both a stationary and a rotatory portion. This unit includes one or more solenoids, at least one pressure sensor or transducer, and rotatory seals. The solenoids function as switches to control the flow of air. When a solenoid is open, it permits pressurized air to enter the tire associated with the pressure control unit, whereas closing it blocks the flow of pressurized air. Another solenoid governs the flow of pressurized air out of the tire, allowing it to escape when open and preventing its escape when closed. In an embodiment, the release of the air from the tire may be to the open air.

Figure 1B:
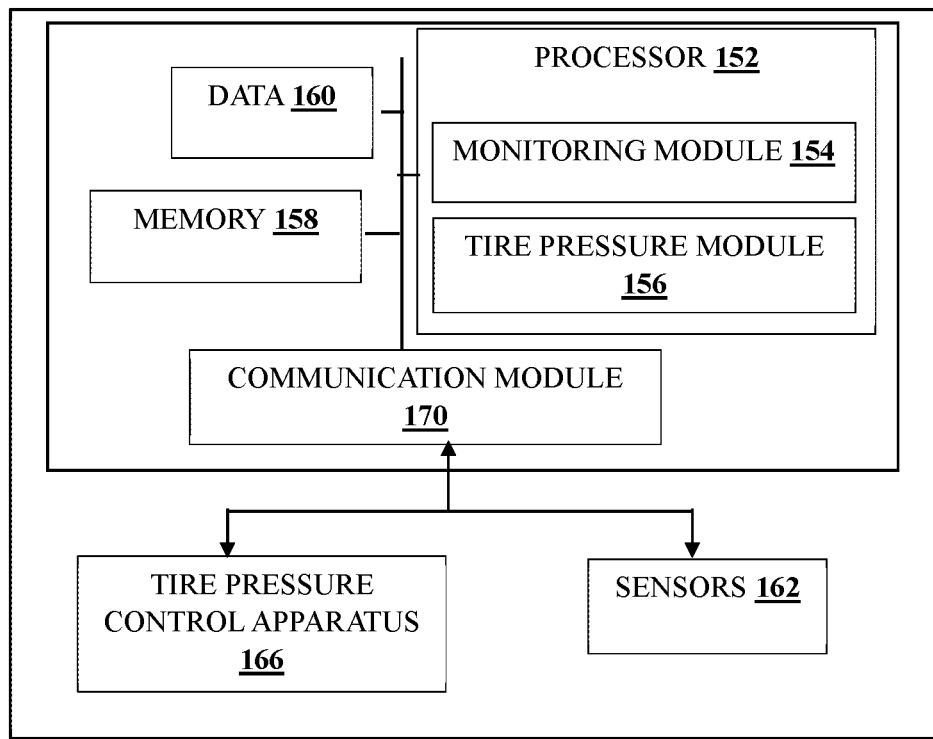
FIG. 1B is an illustration of an example vehicle with various sensors, actuators, and systems according to an embodiment.

Referring to FIG. 1B, it shows a block diagram of an adaptive tire pressure management system according to one or more embodiments. The system comprises a processor 152 comprising a monitoring module 154, a tire pressure module 156, and tire pressure control apparatus 166, and a memory 158. The monitoring module 154 disclosed herein is designed to capture and analyze an extensive range of data pertaining to road conditions, environmental variables, vehicle functions, energy efficiency, and overall performance. The sensor array incorporated into the monitoring module comprises various sensors, each strategically placed within the vehicle. These sensors are capable of continuously measuring and collecting data related to road conditions (e.g., traction, road surface type), environmental conditions (e.g., temperature, humidity), vehicle functions (e.g., engine performance, tire pressure), energy efficiency (e.g., fuel/battery consumption, battery usage), and overall vehicle performance (e.g., acceleration, braking). The tire pressure module 156, equipped with appropriate algorithms and logic, evaluates the data, and determines if any action is required to maintain or adjust tire pressure. The tire pressure control apparatus 166 is typically installed to be fluidically connected to each wheel well of the vehicle. It measures the tire pressure using the pressure sensors and transmits this information to the processor. In an embodiment, the tire pressure is measured periodically. In an embodiment, the tire pressure is measured continuously. In an embodiment, the tire pressure is measured upon signal from the processor and in real-time. The processor, equipped with appropriate algorithms and logic, evaluates the data, and determines if any action is required to maintain or adjust tire pressure. If needed, the regulator valve is activated to release or introduce air, thus ensuring that the tire pressure remains within predefined optimal limits. The processor may comprise multiple processors working in synergy to receive data from these sensors in real-time and process it using proprietary software algorithms. It can detect anomalies, predict trends, and provide feedback to the driver or vehicle systems in real-time, thus enhancing safety and operational efficiency.

The system is also equipped with data communication interfaces to transmit data to external sources or receive data from external sources for analysis and reporting. A user interface, which may include visual displays on the vehicle's dashboard, mobile apps, or other means, present real-time data to the driver, allowing for informed decisions while operating the vehicle. A power supply ensures uninterrupted operation of the monitoring module, guaranteeing reliable and continuous monitoring capabilities.

As used herein, the monitoring module is a comprehensive system comprising both a software component and a measuring device. The measuring device may be a component of the monitoring module. The measuring device comprises one or more sensors 162 that are capable of collecting various types of data 160. The one or more sensors comprises accelerometer, gyroscope, magnetometer, pressure sensor, temperature sensor, occupancy sensor, mass airflow sensor, engine speed sensor, oxygen sensor, spark knock sensor, coolant sensor, fuel temperature sensor, voltage sensor, camshaft position sensor, throttle position sensor, cameras, and microphones.

The system further comprises a communication module 170, and the components of the system are each operably connected for computer communication via a bus and/or other wired and wireless technologies defined herein. The system can include provisions for processing, communicating, and interacting with various components of the vehicle and other components of the system, including the other vehicles, the monitoring module 154, and the tire pressure module 156.

Figure 1C:
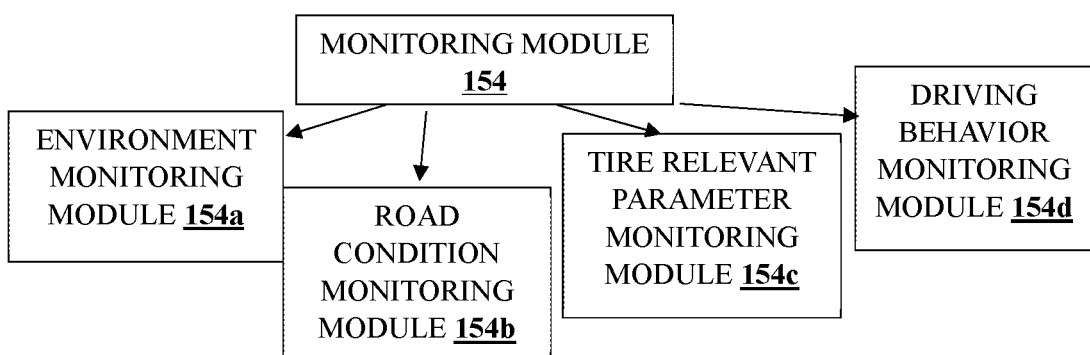
FIG. 1C shows example sub-modules of the monitoring module according to one or more embodiments.

Referring to FIG. 1C, it shows example sub-modules of the monitoring module 154 according to one or more embodiments. The monitoring module 154 comprises an environment monitoring module 154a, a road condition monitoring module 154b, a tire relevant parameter monitoring module 154c, and a driving behavior monitoring module 154d. The environment monitoring module 154a may receive sensor data from one or more sensors to determine weather conditions near the vehicle. In some cases, the environment monitoring module 154a may request, or otherwise receive, weather information from a weather forecasting computer system via the network. The sensor information may include signals from a moisture sensor indicating a presence of moisture (e.g., rain, snow, sleet, etc.) at the vehicle, a barometer may provide a signal indicative of a change in atmospheric pressure near the vehicle, a camera may show building clouds and/or precipitation, etc. The environment monitoring module 154a may process the received sensor information to determine whether inclement weather conditions are present, or may soon be present, near the vehicle. For instance, a sensor signal, or combination of signals (e.g., a weighted combination) may be processed (e.g., compared to one or more thresholds) to determine a likelihood that an inclement weather condition is present, or soon may be present. The road condition monitoring module 154b may receive sensor data or communication from one or more sensors (e.g. rotational speed sensor, accelerometers, gyroscopes, barometers, GPS sensors or unit, cameras, radar, IR sensors, and laser sensors, among others) to provide information such as friction, road roughness, presence of potholes, speed bumps, and obstacles. With the obtained data from one or sensors, as vehicles travel on, the road condition monitoring module 154b may create a road map divided into cells, each with assigned probabilities for different road surface parameters to calculate the likelihood of specific road conditions (like potholes or ice) for different sections of the road. This can be done by combining data from various sources, including the sensors on vehicles and other external sources, and assigning different probabilities to different road conditions in each section of the road based on this aggregated data.

In some embodiments, the monitoring module 154 further comprises a tire relevant parameter monitoring module 154c. In an example, a first sensor unit is mounted on the tire and includes a footprint centerline length measurement sensor to measure a centerline length of a footprint of the tire. A second sensor unit is mounted on the tire and includes a shoulder length measurement sensor to measure the shoulder length of the footprint of the tire. At least one of the first sensor unit and the second sensor unit includes a pressure sensor to measure a pressure of the tire, a temperature sensor to measure a temperature of the tire, and an electronic memory for storing identification information for the tire. The processor is in electronic communication with the first sensor unit and the second sensor unit and receives the measured centerline length, the measured pressure, the measured temperature, the identification information, and the measured shoulder length. A tire construction database stores tire construction data and is in electronic communication with the processor. The tire construction data comprises tire size and dimension, load index, tire type, thread depth, sidewall information, tire model and series, chemical composition and properties of tire material, production date and batch information, Test results and performance data, vehicle fitment data, tire labeling data and environmental impact data and the like. Tire construction data play a crucial role in adaptive tire pressure management by providing essential information that helps optimize tire pressure settings and improve overall performance. For example, the system uses data on load ratings and specifications for each tire type to determine the appropriate tire pressure settings based on the vehicle's load. By adjusting tire pressure according to the recommended load ratings, the system ensures that tires are neither overinflated nor underinflated for the given load. Data on tire size, aspect ratio, and rim diameter helps the system determine the tire's contact patch with the road and its overall shape. This data can be used to calculate the optimal tire pressure for traction, handling, and comfort. The identification information is correlated to the tire construction data. An analysis module is stored on the processor and receives the measured centerline length, the measured pressure, the measured temperature, the identification information, the tire construction data, and the measured shoulder length as inputs. The analysis module includes a prediction model that generates an estimated wear for the tire from the inputs. In an example, one or more cameras onboard the vehicle is operable to take pictures of the tire tracks created by the tires as the vehicle moves. The processor is operable to analyze tire tread and sidewall patterns of the tire using the captured images. This information is then compared to a database of known patterns to determine the condition of the tires, including wear and tear, inflation, alignment, and other health measures. In addition, in certain embodiments, the processor can also use sensor data related to the vehicle's motion and measurements to diagnose possible issues pertaining to the tires, such as possible wear, inflation, misalignment, punctures, other imperfections, and so on. In another example, a separate odometer for each tire or wheel end, along with tire diagnostics and prognostics, serves as a comprehensive tire monitoring solution. Separate odometers for each tire or wheel end provide precise data on the mileage and usage of each tire. This information is crucial for monitoring tire wear and identifying irregular wear patterns. Odometer data allows for the comparison of mileage across all tires, helping to detect potential alignment issues, uneven loading, or suspension problems that may be affecting tire wear. The system collects and stores data from individual tire odometers, diagnostics, and prognostics. Fleet managers can analyze this data to make informed decisions about tire selection, maintenance practices, and operational improvements. This module not only alerts about tire pressure anomalies but also assesses conditions requiring tire deflation. It provides information such as detecting air loss in a tire, specifying the rate of air loss (if any), evaluating whether the system can rectify the air loss by supplying adequate air to the leaking tire, and determining if the current trip can be safely completed. This data can be communicated locally within the vehicle or remotely to telematics, maintenance, fleet management, or another relevant entity. For instance, if a tire experiences certain conditions that necessitate deflation, this information can be relayed to the appropriate parties, enabling prompt action to ensure vehicle safety and operational efficiency. In example embodiments, the tire health monitoring and parameter adjustment (e.g., tire rotation, tire pressure change) may be carried out while the vehicle is in motion and does not require the vehicle to be brought to a stop for either the monitoring or the parameter adjustment to occur. In another example, the tire relevant parameter monitoring module 154c can detect a tire inflation pressure loss from tire inflation pressure values measured directly by the tire pressure module.

In some embodiments, the monitoring module further comprises a driving behavior monitoring module 154d. In an example, the driving behavior monitoring module 154d may utilize visual data from one or more cameras affixed to the vehicle and determine a classification of a driving behavior based at least in part on the visual data and an inference engine. The inference engine is a computational component of the system that uses rules, logic, algorithms, and data analysis techniques to analyze visual data from vehicle cameras and interpret the classification of driving behavior. It processes visual data to make assessments about how the vehicle is being driven, such as whether the driver is driving aggressively, recklessly, or in a safe and responsible manner. In another example, the driving behavior monitoring module 154d may process vehicle usage data and road usage data to generate a driving behavior score.

In some embodiments, the driving behavior monitoring module is provided with a wireless data transceiver such as a Bluetooth® unit which wirelessly transmits vehicle usage data to a roadway manager. The roadway manager transmits the vehicle usage data, optionally along with vehicle positional data obtained from a GPS unit to a computing server via a standard mobile telecommunications network. In an embodiment, the data may be encrypted before transmission. The computing server is operated remotely and comprises a database on which vehicle usage data is stored, and from which a driving behavior score is calculated, stored, and transmitted to the roadway manager and/or optionally to a website. The driving behavior score is calculated by a scoring module on the computing server from the vehicle usage data generated by the driving behavior monitoring module, the vehicle positional data if any, the vehicle usage data stored on the database, and optionally from road speed limit data obtained from a road speed limit service. The scoring module is operative to generate an alert signal, a score which rates the driving behavior of the driver of the vehicle in real-time on a predetermined scoring system stored on the database. That scoring module may reference other vehicle usage data prestored on the database such as earlier scores of the driver in question, earlier scores for the vehicle in question, and any other desired data such as relating to manufacturer's stated vehicle performance, and the age of the vehicle, for example. The score may be generated so as to provide the driver with an indicator of a driving or vehicle characteristic. That characteristic might be how safely the driver is driving, or how fuel-efficient the driver is driving. The signal indicative of the driving behavior score is transmitted from the computing server to the roadway manager in real-time, via the mobile telecommunications network. The roadway manager may be operative to store the score for later review or may be operative to instantaneously display the score on the display or an associated display of the driving behavior monitoring module.

Figure 2:
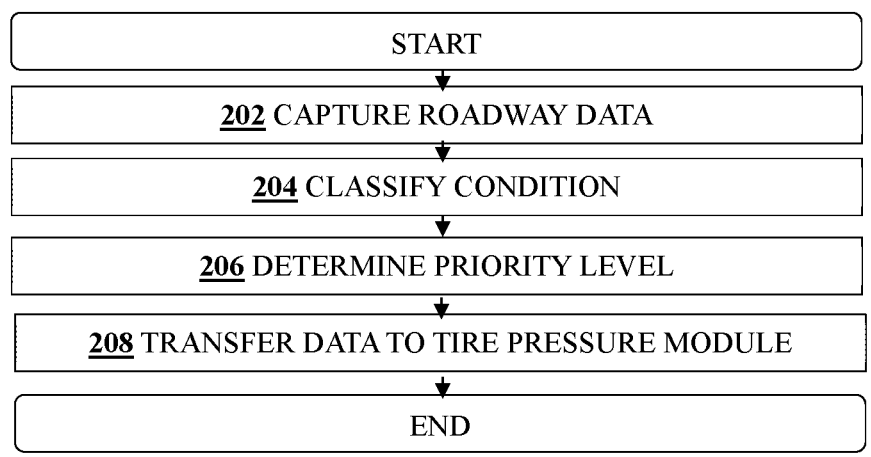
FIG. 2 shows a method for road condition monitoring according to one or more embodiments.

Referring to FIG. 2, it shows a method for road condition monitoring according to one embodiment. At block 202, the method includes capturing roadway data. For example, the roadway data can be captured from nearby vehicles using the vehicle's communication module and/or the sensors. In other embodiments, roadway data can be captured by other connected vehicles, connected infrastructures/devices, and/or accessed from the other road condition data sources. At block 204, the method includes classifying a road condition based on the roadway data. In the embodiments discussed herein, a condition based on the roadway data can be referred to as a roadway condition and/or a weather condition. For example, using the roadway data, any weather conditions, and/or road conditions combined, a roadway condition can be indicated with a percentage or level of the condition. The term "level" refers to any numerical or other kind of value for distinguishing between two or more conditions or states (e.g., roadway conditions, weather conditions, driving conditions). At block 206, the method includes determining a priority level. In some embodiments, the classification and the roadway data can be used to determine a priority level. In some embodiments, the priority level indicates a level of severity and/or a level of urgency of tire pressure change and/or tire change. At block 208, the method includes transmitting the data to the tire pressure module. The data can include the roadway data, the condition, and/or the priority level along with other data related to the location, condition, priority level, etc. In some embodiments, the data includes data aggregated and/or analyzed by the road condition monitoring module.

Figure 3:
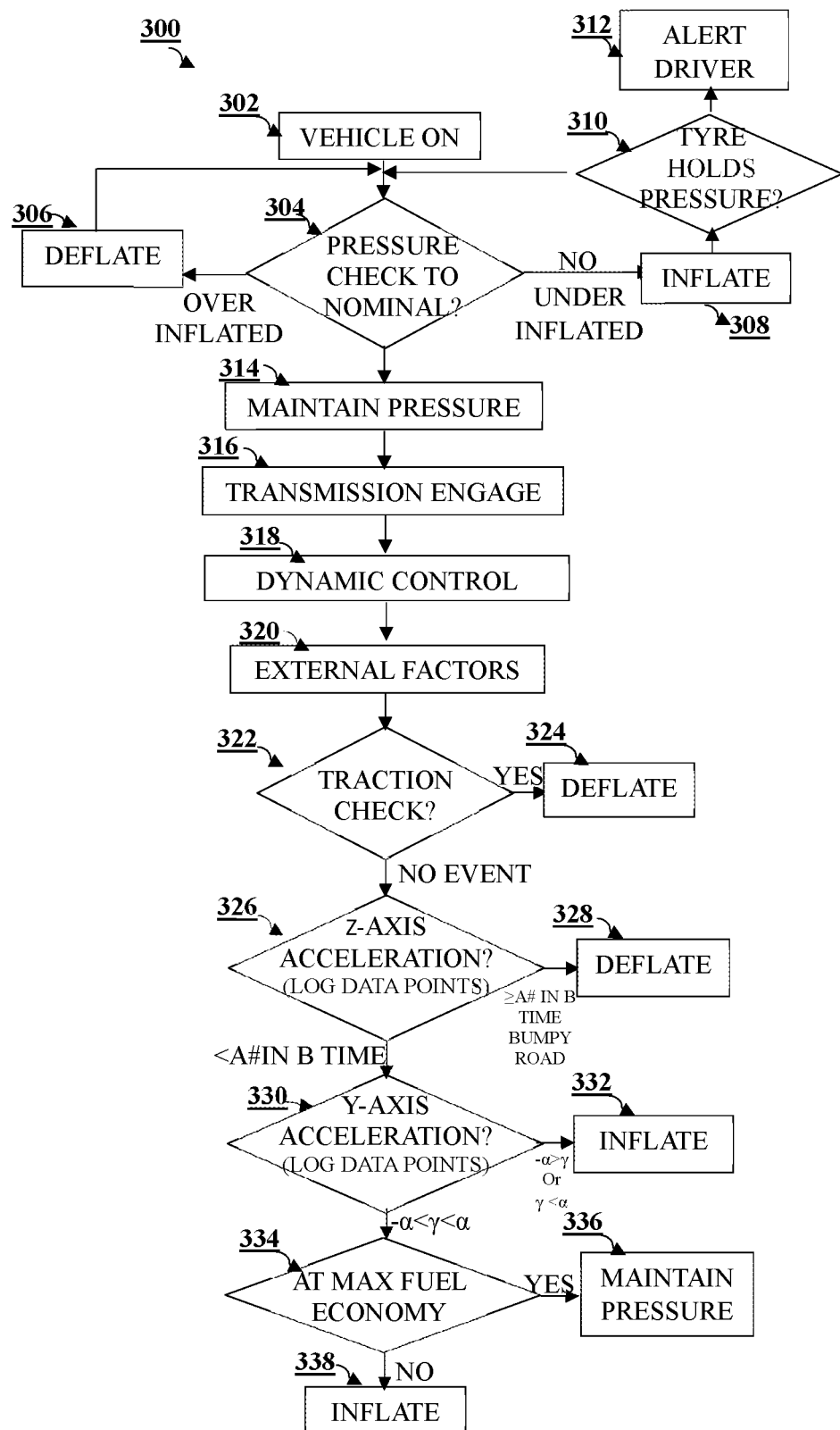
FIG. 3 is an example procedure for adjusting a tire pressure.

Referring to FIG. 3, it is an illustrative process for tire pressure management, according to one or more embodiments. Process 300 starts in step 302 with the vehicle's ignition and proceeds to step 304, where the measured tire pressure is compared to an estimated range based on monitored parameters. The monitored parameters comprise one or more of vehicle type, tire type, weather condition, road condition, load, driving mode, driving behavior etc. If the tire pressure falls below the pre-estimated range, the process advances to step 308, where the tire is automatically inflated. In some instances, after step 308, the process may progress to step 310, where the tire pressure is assessed to ensure that there is no pressure loss. If pressure loss is detected, the process moves to step 312, where an alert is issued to the driver, such as through an illuminated dashboard light. If, in step 304, the tire pressure exceeds the estimated range, the process may proceed to step 306, where the tire is deflated. Steps 304, 306, and steps 304, 308, 310 can be iterated as needed within the process until the tire pressure falls within the estimated range. In step 314, the estimated tire pressure range is maintained while the vehicle is stationary. In step 316, when the transmission is engaged, indicating that the driver is preparing to drive the vehicle by taking it out of park, the process continues to step 318. Steps 318-320 involve the activation of dynamic pressure control to start modifying the vehicle's tire pressure according to the vehicle's condition (step 318) and external inputs received by the monitoring module (step 320). As explained in more detail previously, these inputs could encompass information on ambient weather conditions (e.g., temperature, humidity, precipitation, etc.), navigation data (e.g., to anticipate upcoming turns), driving modes (e.g., sport, comfort, fuel economy, etc.), etc. In step 322, the traction of the vehicle's tires is analyzed to determine whether there is any loss of traction. For instance, the system could deduce that the vehicle is losing traction upon receiving an indication that the vehicle's emergency braking, or forward collision warning system has been activated. In such an instance, the process moves on to step 324, where the tire(s) are deflated to a specific braking pressure. Otherwise, the process proceeds to step 326. In step 326, another decision is made regarding whether the vehicle is accelerating in the z-axis (e.g., a direction substantially perpendicular to the road). This condition might arise if the road is uneven or if the vehicle is traveling over rough terrain. In one embodiment, z-axis acceleration can be monitored using a vehicle-installed laser scanner to gauge and predict immediate future road conditions and adjust the tire pressure accordingly. In some embodiments, the system could determine if the z-axis acceleration is greater than or equal to a specified threshold within a set timeframe. If this is the case, the process moves to step 328, where the tire(s) are deflated by a specific amount. In certain situations, the degree of deflation might be influenced by the selected user mode. For instance, if the user has chosen a mode prioritizing passenger comfort, the tire may be deflated to a greater extent compared to a mode emphasizing fuel efficiency. If a z-axis acceleration event is not detected in step 326, the process proceeds to step 330. In step 330, a decision is made regarding whether the vehicle is currently in the process of cornering. This determination could be based on whether the y-axis acceleration (an axis extending through the driver and passenger side doors) exceeds or falls below a specific threshold (e.g., $-\alpha > Y$ or $Y > \alpha$). These comparisons can indicate whether the vehicle is turning left or right. If the vehicle is determined to be in a cornering state, the process moves to step 332, where the outside tires (opposite to the turning direction) are inflated. In one embodiment, the inside tires may also be deflated in step 332, in addition to or in place of inflating the outside tires. If no cornering state is detected in step 330, the process advances to step 334. In step 334, the estimated fuel efficiency of the vehicle is compared to a target fuel efficiency value. If the fuel efficiency matches the target value, the process continues to step 336, where the current tire pressure is maintained. However, if the fuel efficiency is lower than the target, the process proceeds to step 338, where the tire pressure is increased, as necessary. According to certain embodiments, the process may return to step 320 following any of steps 324, 328, 332, 336, or 338, thus offering continuous and dynamic tire pressure adjustment while driving. If the vehicle is at parking, the process may revert to step 304 in one embodiment. Similarly, if the vehicle is turned off and later restarted, the process may start again in step 302.

An embodiment relates to a method comprising receiving data comprising a first tire pressure of a tire of a vehicle, a weather condition, and a road condition, determining a second tire pressure of the tire based on the weather condition and the road condition, determining a requirement for adjustment of the first tire pressure to the second tire pressure for the tire, and communicating a command to a tire pressure control apparatus for adjusting the first tire pressure to the second tire pressure.

An embodiment relates to a non-transitory computer-readable medium for managing tire pressure of a tire associated with a vehicle, the non-transitory computer-readable medium comprising instructions executed to receive data comprising a first tire pressure of a tire of the vehicle, a weather condition, and a road condition, determine a second tire pressure of the tire based on the weather condition and the road condition, determine a requirement for adjustment of the first tire pressure to the second tire pressure for the tire, and communicate a command to a tire pressure control apparatus for adjusting the first tire pressure to the second tire pressure.

An embodiment relates to a system comprising a monitoring module, a tire pressure module, and tire pressure control apparatus, a processor, and a memory coupled to the processor, the memory comprising instructions executable by the processor to measure a first tire pressure of a tire of a vehicle, determine a current weather condition and a current road condition, adjust the first tire pressure to a second tire pressure based on the current weather condition and the current road condition, receive a future destination, determine a route to the future destination of the vehicle, an expected weather condition at the future destination, and an expected road condition at the future destination, compare the tire pressure with a target tire pressure set based on the expected weather condition and the expected road condition, determine the tire pressure being at least one of an over inflated or under inflated, determine a future tire pressure scheme to be adopted during a trip based on the expected weather condition and the expected road condition, and communicate the future tire pressure scheme to the tire pressure control apparatus to be adopted during the trip.

An embodiment relates to a method comprising measure a first tire pressure of a tire of a vehicle, determine a current weather condition and a current road condition, adjust the first tire pressure to a second tire pressure based on the current weather condition and the current road condition, receive a future destination, determine a route to the future destination of the vehicle, an expected weather condition at the future destination, and an expected road condition at the future destination, compare the tire pressure with a target tire pressure set based on the expected weather condition and the expected road condition, determine the tire pressure being at least one of an over inflated or under inflated, determine a future tire pressure scheme to be adopted during a trip based on the expected weather condition and the expected road condition, and communicate the future tire pressure scheme to the tire pressure control apparatus to be adopted during the trip.

An embodiment relates to a non-transitory computer-readable medium for managing tire pressure of a tire associated with a vehicle, the non-transitory computer-readable medium comprising instructions executed to measure a first tire pressure of a tire of a vehicle, determine a current weather condition and a current road condition, adjust the first tire pressure to a second tire pressure based on the current weather condition and the current road condition, receive a future destination, determine a route to the future destination of the vehicle, an expected weather condition at the future destination, and an expected road condition at the future destination, compare the tire pressure with a target tire pressure set based on the expected weather condition and the expected road condition, determine the tire pressure being at least one of an over inflated or under inflated, determine a future tire pressure scheme to be adopted during a trip based on the expected weather condition and the expected road condition, and communicate the future tire pressure scheme to the tire pressure control apparatus to be adopted during the trip.

An embodiment relates to a system comprising: system comprising: a tire pressure control apparatus, a processor comprising a monitoring module and a tire pressure module, and a memory coupled to the processor, the memory comprising instructions executable by the processor to receive a route, determine an optimal tire pressure for a tire of a vehicle based on at least one of a terrain and a weather condition prior to a trip along the route, determine a tire pressure scheme prior to the trip based on the route, wherein the tire pressure scheme comprises a first tire pressure configuration for a first segment of the trip and a second tire pressure configuration for a second segment of the trip, identify a location along the route for adjusting a current tire pressure based on the tire pressure scheme, and communicate a command to the tire pressure control apparatus for adjusting the current tire pressure to the first tire pressure configuration for the first segment of the trip and the second tire pressure configuration for the second segment of the trip. The system leverages road condition data and other inputs to determine and adjust the optimal tire pressure for a trip. It continuously monitors road conditions and adapts its tire pressure change plan to ensure that the vehicle maintains peak performance and safety throughout the trip. This adaptive approach helps to maximize energy efficiency, reduce tire wear, and enhance the overall driving experience.

The system gathers road condition data from other vehicles that have traveled the route. This data helps the system understand the current state of the road, including factors like surface quality, roughness, obstacles, and potential hazards. Using the collected road condition data and other relevant factors, the system calculates the optimal tire pressure scheme for the entire trip. The optimal tire pressure is determined based on a combination of road conditions, weather, driving habits, energy efficiency considerations, and other relevant parameters. The system develops a tire pressure change plan that outlines when and where tire pressure adjustments should occur during the trip. This plan is based on the calculated optimal tire pressure and considers specific points along the route where pressure adjustments are deemed necessary. The system continuously monitors the road conditions throughout the trip, adapting to changes that may occur. If the system detects changes in road conditions compared to its initial assessment, it recalculates the optimal tire pressure scheme to adapt to the new conditions. The tire pressure is adjusted in real-time as the vehicle progresses along the route. The system determines the appropriate locations on the road where tire pressure adjustments should take place. The system tracks the vehicle's location and sends messages in advance to prepare for tire pressure adjustments. Messages are sent to the vehicle's tire pressure control apparatus to instruct it on when and how to adjust the tire pressure. By maintaining optimal tire pressure tailored to current road conditions, the system enhances energy efficiency, handling, and overall vehicle performance. If road conditions change during the trip, the system re-evaluates the tire pressure change plan to ensure that adjustments are aligned with the current conditions.

In an embodiment, the location is identified via one of a Global Positioning System (GPS) and a navigation system. In another embodiment, the optimal tire pressure of the tire is calculated by assigning different weights to one or more of tread life, traction, driver comfort, noise, fuel economy, blowout prevention, or an environment condition factor. In another embodiment, the system comprises a specific recommended air pressure level for each of the tires of the vehicle based on the optimal tire pressure.

In some embodiments, the processor is further operable to send the command to the tire pressure control apparatus to adjust the current tire pressure of the tire before reaching a specific location along the route where adjustments are needed. In some embodiments, the tire pressure control apparatus is operable to adjust the current tire pressure by inflating the tire. In some embodiments, the tire pressure control apparatus is operable to adjust the current tire pressure by deflating the tire.

An embodiment relates to a method comprising receiving a route, determining an optimal tire pressure for a tire of a vehicle based on at least one of a terrain and a weather condition prior to a trip along the route, determining a tire pressure scheme prior to the trip based on the route, wherein the tire pressure scheme comprises a first tire pressure configuration for a first segment of the trip and a second tire pressure configuration for a second segment of the trip, identifying a location along the route for adjusting a current tire pressure based on the tire pressure scheme, and communicating a command to a tire pressure control apparatus for adjusting the current tire pressure to the first tire pressure configuration for the first segment of the trip and the second tire pressure configuration for the second segment of the trip. In some embodiments, the tire pressure scheme is determined based on a road condition, the weather condition, driver's habit, a wear condition of the tire, a safety consideration, and a fuel efficiency consideration.

In some embodiments, the method further comprises adjusting the current tire pressure of the tire based on the tire pressure scheme, wherein the current tire pressure is adjusted in real-time as the vehicle travels along the route via the tire pressure control apparatus. In some embodiments, adjusting the current tire pressure comprises one of inflating the tire and deflating the tire based on the tire pressure scheme and the optimal tire pressure of the tire. In some embodiments, the method further comprises measuring a rate of air flow that the tire pressure control apparatus is inserting into the tire during a predetermined time period. In some embodiments, the method further comprises determining whether there is a structural flaw with the tire based on the rate of the air flow.

An embodiment relates to a system comprising a non-transitory computer-readable medium for managing tire pressure of a tire associated with a vehicle, the non-transitory computer-readable medium comprising instructions executed to retrieve a route, determine an optimal tire pressure for a tire of the vehicle based on at least one of a terrain and a weather condition prior to a trip along the route, determine a tire pressure scheme prior to the trip based on the route, wherein the tire pressure scheme comprises a first tire pressure configuration for a first segment of the trip and a second tire pressure configuration for a second segment of the trip, identify a location along the route for adjusting a current tire pressure based on the tire pressure scheme, and communicate a command to a tire pressure control apparatus for adjusting the current tire pressure to the first tire pressure configuration for the first segment of the trip and the second tire pressure configuration for the second segment of the trip.

An embodiment relates to a system comprising: a tire pressure control apparatus, a processor comprising a monitoring module, a routing module, and a tire pressure module, and a memory coupled to the processor, the memory comprising instructions executable by the processor to calculate a tire pressure scheme to be utilized by a tire of a vehicle during a trip, communicate a command to the tire pressure control apparatus to adjust tire pressure of a tire based on the tire pressure scheme, detect a problem encountered in adjusting the tire pressure of the tire based on the tire pressure scheme, generate an alert regarding the problem via a driver assistance interface, and recommend an action to mitigate the problem. The system creates a holistic approach to tire pressure management. It continuously assesses road conditions, considers various inputs including driving habits and fuel/charge levels, calculates an adaptive optimal tire pressure scheme, and dynamically adjusts tire pressure as the vehicle progresses on the trip. This approach optimizes performance, fuel efficiency, and safety while providing the driver with real-time information and alerts if any issues arise. The system continuously monitors road conditions in a predefined range around the vehicle during the trip. It gathers data related to road surface, obstacles, hazards, and other conditions that could impact tire performance. Using the collected road condition data and considering additional factors, the system adaptively calculates an optimal tire pressure scheme. The scheme aims to achieve optimal performance, fuel efficiency, and safety based on the current road conditions and driving context. In some embodiments, the system is capable of alerting the driver if any issues arise with the execution of the tire pressure change. If anomalies, failures, or deviations occur, the system informs the driver to take appropriate action.

The system can alert the driver if any issues arise with the execution of the tire pressure scheme. If anomalies, failures, or deviations occur, the system informs the driver to take appropriate action. The driver inputs the desired destination. The system determines the optimal route based on factors like distance, traffic, and road conditions. Determining optimal routes is often done with the assistance of navigation systems and GPS technology. Key considerations for defining an optimal route include minimizing the total distance traveled, particularly in cases where time is critical. Reducing travel time is a primary objective, with a focus on avoiding traffic congestion or selecting routes with lighter traffic, as these factors can significantly impact the overall efficiency of a trip. Additional factors considered when finding an optimal route include prioritizing well-maintained roads over rough or unpaved ones, especially for long-distance travel, avoiding routes with known hazards or adverse weather conditions (e.g., ice and snow on the road up the mountain), and optionally selecting scenic routes, avoiding highways or toll roads, or choosing routes that pass specific points of interest. Road condition information is received and integrated into the scheme calculation process. The system considers the vehicle's current fuel/charge level and the driver's driving habits or preferences (e.g., tour mode or sport mode). Using the combined data, the system calculates a comprehensive optimal tire pressure scheme to be utilized throughout the entire trip. The scheme factors in the start point, end point, road conditions, driver preferences, and fuel/charge levels. As the vehicle travels along the trip, the tire pressure is continuously adjusted based on the calculated optimal tire pressure scheme. Adjustments are made in real-time to ensure that the tire pressure aligns with the changing conditions.

In some embodiments, the processor is further operable to receive a destination and a driving mode for the trip via a user interface, determine an optimal route and a driving habit, and calculate the tire pressure scheme to be utilized during the trip.

In some embodiments, the processor is further operable to monitor a road condition in a predefined range, modify the tire pressure scheme to a second tire pressure scheme based on the road condition and a selected control strategy. The selected control strategy may comprise at least one of performance, safety, and energy efficiency.

In some embodiments, the optimal route to the destination comprises one of 1) shortest time, shortest distance, least traffic, etc. In some embodiments, the optimal route can be a route to the destination which is most frequented by vehicles. The system, via machine learning algorithms, can process and analyze various data inputs, including historical route data, user behavior, traffic conditions, and other factors, to make predictions about the most frequented routes. Also, the system can track the routes selected by the driver and may store historical route data for analysis.

An embodiment relates to a method, the method comprising calculating a tire pressure scheme to be utilized during a trip, communicating a command to a tire pressure control apparatus to adjust tire pressure of a tire based on the tire pressure scheme, detecting a problem encountered in adjusting the tire pressure of the tire based on the tire pressure scheme, generating an alert regarding the problem via a driver assistance interface, and recommending an action to mitigate the problem.

Figure 4A:
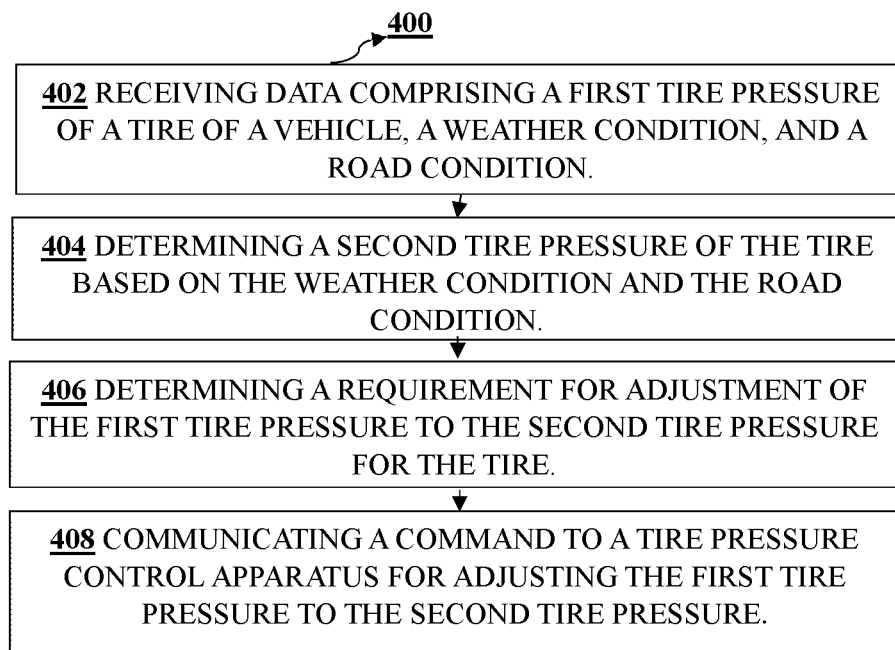
FIG. 4A shows a method for tire pressure management according to one or more embodiments.

Referring to FIG. 4A, the figure depicts a workflow for tire pressure management, according to one or more embodiments.

In step 402, tire pressure management process 400 comprises receiving data comprising a first tire pressure of a tire of a vehicle, a weather condition, and a road condition.

In step 404, tire pressure management process 400 further comprises determining a second tire pressure of the tire based on the weather condition and the road condition.

In step 406, tire pressure management process 400 further comprises determining a requirement for adjustment of the first tire pressure to the second tire pressure for the tire.

In step 408, tire pressure management process 400 further comprises communicating a command to a tire pressure control apparatus for adjusting the first tire pressure to the second tire pressure.

In an embodiment, the method further comprises measuring a rate of air flow that the tire pressure control apparatus is inserting into the tire during a predetermined time period. In another embodiment, the method further comprises determining whether there is a structural flaw with the tire based on a rate of air flow. In yet another embodiment, the method further comprises adjusting the first tire pressure to the second tire pressure by performing one of inflating the tire and deflating the tire. In yet another embodiment, the method further comprises the adjustments of the first tire pressure are made in real-time throughout a trip.

In an embodiment, calculating the tire pressure scheme comprises receiving a destination and a driving mode for the trip via a user interface, determining an optimal route and a driving habit, and calculating the tire pressure scheme to be utilized during the trip.

In some embodiments, the method further comprises monitoring a road condition in a predefined range and modifying the tire pressure scheme to a second tire pressure scheme based on the road condition and a selected control strategy wherein the control strategy comprises at least one of performance, safety, and energy efficiency.

In some embodiments, the tire pressure is dynamically and seamlessly adjusted based on the second tire pressure scheme.

Figure 4B:
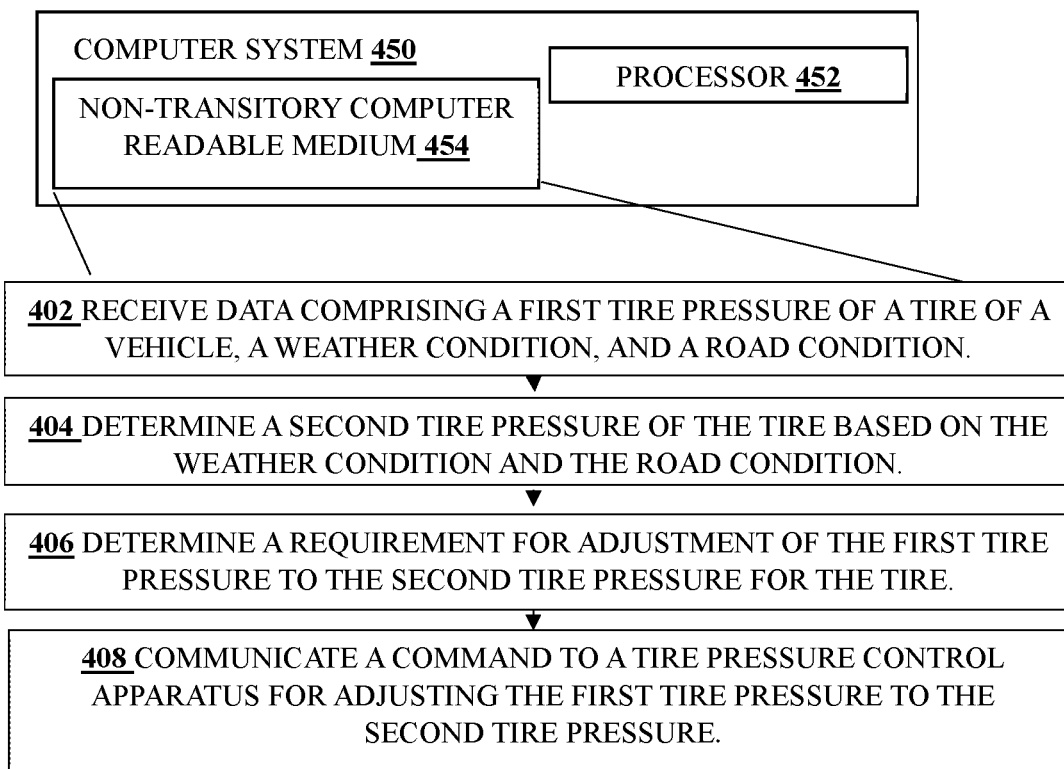
FIG. 4B shows a non-transitory storage medium to store instructions for tire pressure management according to one or more embodiments.

In an embodiment, a non-transitory computer-readable medium for managing tire pressure of a tire associated with a vehicle, the non-transitory computer-readable medium comprising instructions executed to calculate a tire pressure scheme to be utilized during a trip, communicate a command to a tire pressure control apparatus to adjust tire pressure of the tire based on the tire pressure scheme, detect a problem encountered in adjusting the tire pressure of the tire based on tire pressure scheme, generate an alert regarding the problem via a driver assistance interface, and recommend an action to be taken to mitigate the problem. In some embodiments, the non-transitory computer-readable medium further comprise instructions like receive a destination and a driving mode for the trip via a user interface, determine an optimal route and a driving habit, calculate the tire pressure scheme to be utilized during the trip, receive a road condition in a predefined range, and determine a second tire pressure scheme based on the road condition and a selected control strategy. Referring to FIG. 4B, it shows a computer readable medium to store instructions for executing the method described in FIG. 4A. A computer system 450 comprises a non-transitory computer readable medium 454 that stores instructions comprising: In step 402, receiving data comprising a first tire pressure of a tire of a vehicle, a weather condition, and a road condition, in step 404, determining a second tire pressure of the tire based on the weather condition and the road condition, in step 406, determining a requirement for adjustment of the first tire pressure to the second tire pressure for the tire, and in step 408, communicating a command to a tire pressure control apparatus for adjusting the first tire pressure to the second tire pressure.

An embodiment relates to a system comprising a monitoring module, a navigation module, a tire pressure module, a tire pressure control apparatus, a processor, and a memory coupled to the processor, the memory comprising instructions executable by the processor to receive a route and a driving mode, retrieve from an external database an upcoming road condition and an upcoming weather condition in a trip on the route, and determine a tire pressure scheme based on the upcoming road condition and the upcoming weather condition, and send a command to the tire pressure control apparatus to adjust a current tire pressure of the tire based on the tire pressure scheme. The system provides recommendations, allows user-driven modifications, adapts to changing weather conditions, considers tire condition, and utilizes predictive modeling to predict future tire pressure schemes. This holistic approach contributes to enhanced performance, efficiency, and safety throughout the trip.

In some embodiments, the disclosed tire management system may be used in connection with load monitoring systems (generally found on air-ride trailers). A load sensor may sense the trailer load. For example, the trailer may have air bags that cushion the load from road conditions, and also maintain the trailer bed level at a certain height.

Figure 5:
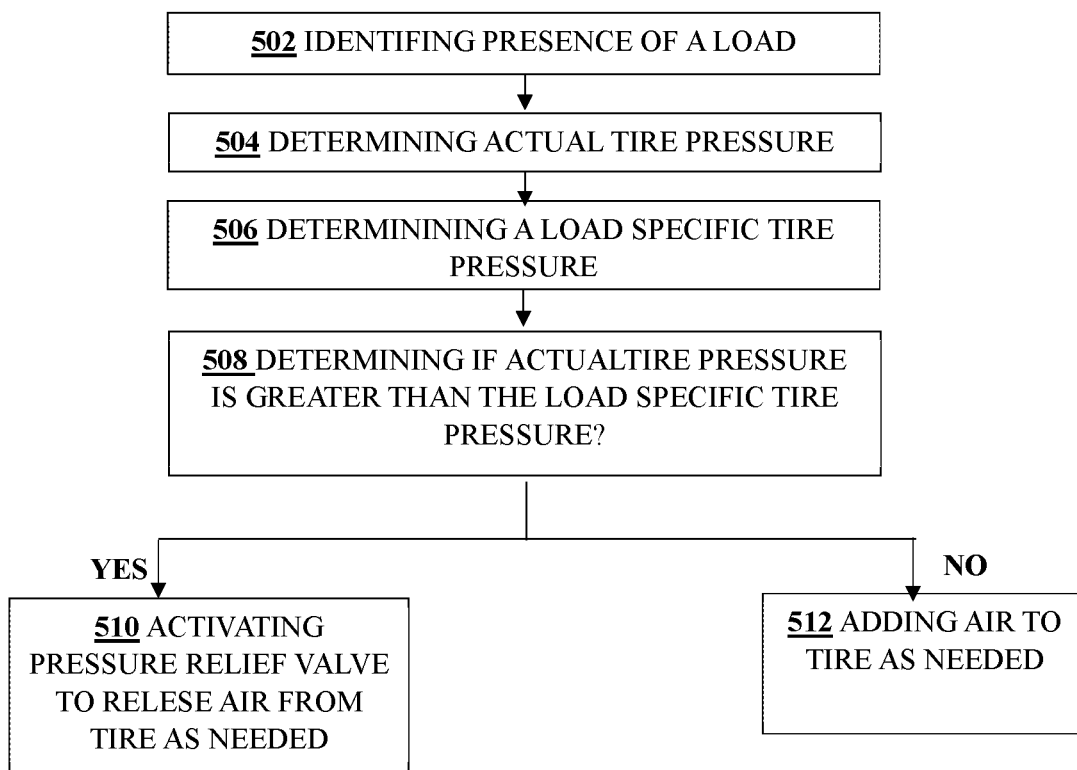
FIG. 5 is a flow chart of a method of calculating an optimum route according to one or more embodiments.

Referring to FIG. 5, it is a flowchart for adjusting tire pressure based on trailer load, according to one or more embodiments. In step 502, the method 500 comprises identifying a load on the vehicle 502. In an example, the load pressure in the air bag may be sensed through the use of, for example, a pressure transducer. In step 504, the method 500 comprises determining actual tire pressure of tires. In step 506, the method 500 comprises determining load specific tire pressure. In step 508, the method further comprises determining if actual tire pressure is greater than the load specific tire pressure. If the actual tire pressure is greater than the load specific tire pressure, in step 510, the method further comprises activating the pressure relief valve to release air. If the actual tire pressure is not greater than the load specific tire pressure, in step 512, the method further comprises adding air to the tire as needed.

Figure 6A:
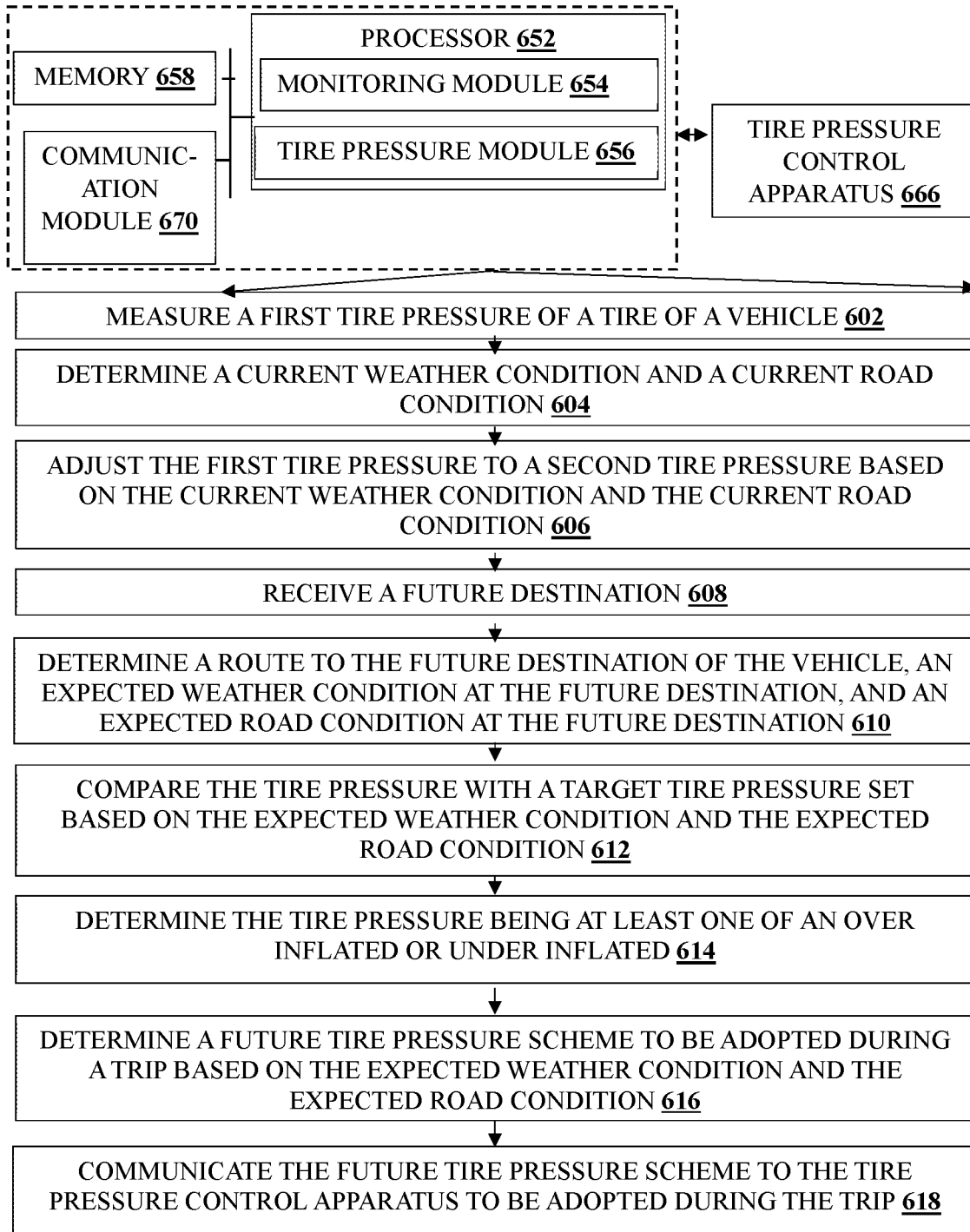
FIG. 6A, FIG. 6B, and FIG. 6C shows block diagrams of a system, method, and computer readable medium for tire pressure management respectively, according to one or more embodiments.

Referring to FIG. 6A, it shows a system for tire pressure management according to one or more embodiments. This system comprises a monitoring module 654, a tire pressure module 656, communication module 670, and a tire pressure control apparatus 666, all orchestrated by a processor 652 coupled to a memory unit 658. The memory contains a set of executable instructions that enable the processor to carry out an array of tasks that are described in FIG. 6B. In some embodiments, the system generates tire pressure scheme recommendations based on factors like weather conditions, driving preferences (tour or sport mode), and available fuel/charge range. The recommendations aim to optimize tire pressure for performance, efficiency, and safety. In some embodiments, the user has the ability to alter the recommended tire pressure scheme according to their preferences or needs. This flexibility allows the driver to make adjustments that align with their specific requirements. In some embodiments, the system continuously monitors weather conditions during the trip. If weather conditions change, the adaptive tire pressure system adapts the tire pressure scheme accordingly to enhance performance and safety. In some embodiments, the system can adaptively modify the tire pressure scheme for specific portions of the trip. This approach allows the system to concentrate its resources on actively determining the optimal tire pressure for short segments. In some embodiments, the tire pressure scheme takes into account the condition of the tires currently installed on the vehicle. Different tire types or tire conditions may warrant different pressure settings for optimal performance. For longer trips, the system may monitor tire wear to make necessary adjustments to the tire pressure scheme. This ensures that tire pressure remains optimized despite changes in tire condition over time.

In some embodiments, the system further comprises a machine learning model wherein the machine learning model is configured to estimate the second tire pressure is determined based on at least one of a planned route, current weather conditions, forecasted weather conditions, driving habits, and energy efficiency of the vehicle. In some embodiments, the machine learning model is configured to learn using labelled data using a supervised learning method, wherein the supervised learning method comprises logic using at least one of a decision tree, a logistic regression, a support vector machine, a k-nearest neighbors, a Naïve Bayes, a random forest, a linear regression, a polynomial regression, and a support vector machine for regression. In some embodiments, the machine learning model is configured to learn from the real-time data using an unsupervised learning method, wherein the unsupervised learning method comprises logic using at least one of a k-means clustering, a hierarchical clustering, a hidden Markov model, and an apriori algorithm. In some embodiments, the machine learning model has a feedback loop, wherein the output from a previous step is fed back to the model in real-time to improve the performance and accuracy of the output of a next step. In some embodiments, the machine learning model comprises a recurrent neural network model. In some embodiments, the machine learning model has a feedback loop, wherein the learning is further reinforced with a reward for each true positive of the output of the system.

In some embodiments, the system employs artificial intelligence and machine learning to model the effects of past tire pressure schemes implemented during the trip. These predictive models help predict future optimal tire pressure schemes based on historical data and corresponding outcomes. There are different types of learning models, including supervised learning, unsupervised learning, and reinforcement learning, each with specific applications and characteristics. The system uses learning models to understand how past tire pressure adjustments have impacted vehicle performance and to predict future optimal tire pressure schemes. The system collects data on past tire pressure schemes implemented during a trip. This data includes information about the tire pressure adjustments made at different times and under various conditions, such as load changes, temperature, and road types. The system also records the outcomes of these past tire pressure schemes, such as the vehicle's handling, fuel efficiency, tire wear, and safety-related metrics. The system uses AI and machine learning techniques to process the historical data and corresponding outcomes. It employs algorithms that can identify patterns, correlations, and relationships within the data. By analyzing the historical data, the system creates predictive models. These models are capable of forecasting future optimal tire pressure schemes based on the historical data and corresponding outcomes. The output of the system is a set of predictive models that suggest the ideal tire pressure adjustments for various driving conditions. The predictive models "learn" from historical data, iteratively improving their performance as they are exposed to more examples.

In some embodiments, the tire pressure scheme comprises a first tire pressure scheme for a first segment of the route, and a second tire pressure scheme for a second segment of the route. In some embodiments, the first segment of the route and the second segment of the route are based on at least one of a change in the road condition and a change in the weather condition. In some embodiments, the processor is operable to allocate all resources in the system to determine the optimal tire pressure for a predefined yardage of the first segment and the second segment. In some embodiments, the processor is operable to generate a model for predicting a future tire pressure scheme based on an effect of at least one of the first tire pressure scheme and the second tire pressure scheme. In some embodiments, the tire pressure scheme is an optimal tire pressure recommended based on the upcoming road condition, the upcoming weather condition, a safety consideration, and a fuel efficiency consideration.

In some embodiments, the processor is operable to determine tire-specific information of a tire and determine the tire pressure scheme based on the tire-specific information, the upcoming road condition, and the upcoming weather condition. In some embodiments, the tire-specific information comprises at least one of a type of tire, age of tire, tire tread depth, tread wear status, rate of change of air volume, a rate of movement of the tire, and a recommended tire-pressure level. In some embodiments, the tire pressure control apparatus is operable to adjust the tire pressure of the tire in real-time based on the tire pressure scheme during the trip.

In some embodiments, the processor is operable to monitor a road condition and a weather condition during the trip and modify the tire pressure scheme based on a change in one of the road conditions and the weather condition and a selected control strategy. In some embodiments, the processor is operable to recommend a driving speed and a driving mode based on the selected control strategy. In some embodiments, the selected control strategy comprises one or more of energy efficiency, performance, and safety.

An embodiment relates to a method comprising receiving a route and a driving mode, retrieving, from an external database, an upcoming road condition, and an upcoming weather condition in a trip on the route, and determining a tire pressure scheme based on the upcoming road condition and the upcoming weather condition, and sending a command to a tire pressure control apparatus to adjust a current tire pressure of the tire based on the tire pressure scheme. Adjusting the tire pressure comprises deflating the tire or inflating the tire via the tire pressure control apparatus.

Figure 6B:
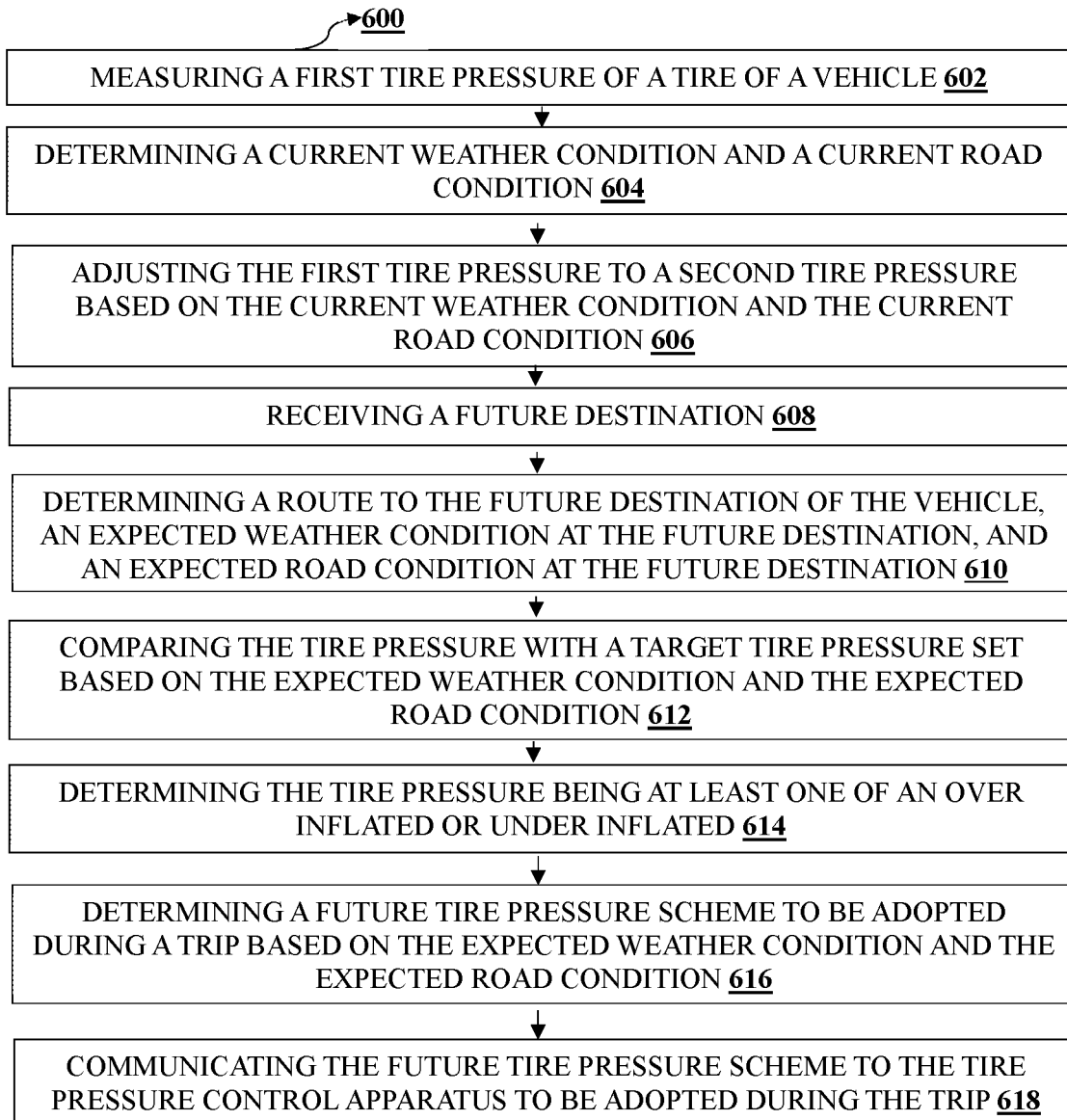

Referring to FIG. 6B, it shows a flowchart of a method for tire pressure management according to one or more embodiments. The method 600 presents a systematic approach to enhance tire performance and vehicle safety.

In step 602, the method 600 comprises measuring a first tire pressure of a tire of a vehicle.

In step 604, the method 600 comprises determining a current weather condition and a current road condition.

In step 606, the method 600 comprises adjusting the first tire pressure to a second tire pressure based on the current weather condition and the current road condition.

In step 608, the method 600 comprises receiving a future destination.

In step 610, the method 600 comprises determining a route to the future destination of the vehicle, an expected weather condition at the future destination, and an expected road condition at the future destination.

In step 612, the method 600 comprises comparing the tire pressure with a target tire pressure set based on the expected weather condition and the expected road condition.

In step 614, the method 600 comprises determining the tire pressure being at least one of an over inflated or under inflated.

In step 616, the method 600 comprises determining the tire pressure being at least one of an over inflated or under inflated.

In step 618, the method 600 comprises communicating the future tire pressure scheme to the tire pressure control apparatus to be adopted during the trip.

In some embodiments, the method further comprises determining tire-specific information of a tire and determining the tire pressure scheme based on the tire-specific information, the upcoming road condition, and the upcoming weather condition. In some embodiments, the method further comprises monitoring a road condition and a weather condition during the trip and modifying the tire pressure scheme based on a change in one of the road conditions, the weather condition, and a selected control strategy. In some embodiments, the method further comprises restricting the adjustment of tire pressure without receipt of an input of the driving mode. In some embodiments, the method further comprises estimating and recording cost of travel along the route for tire pressure scheme.

Figure 6C:
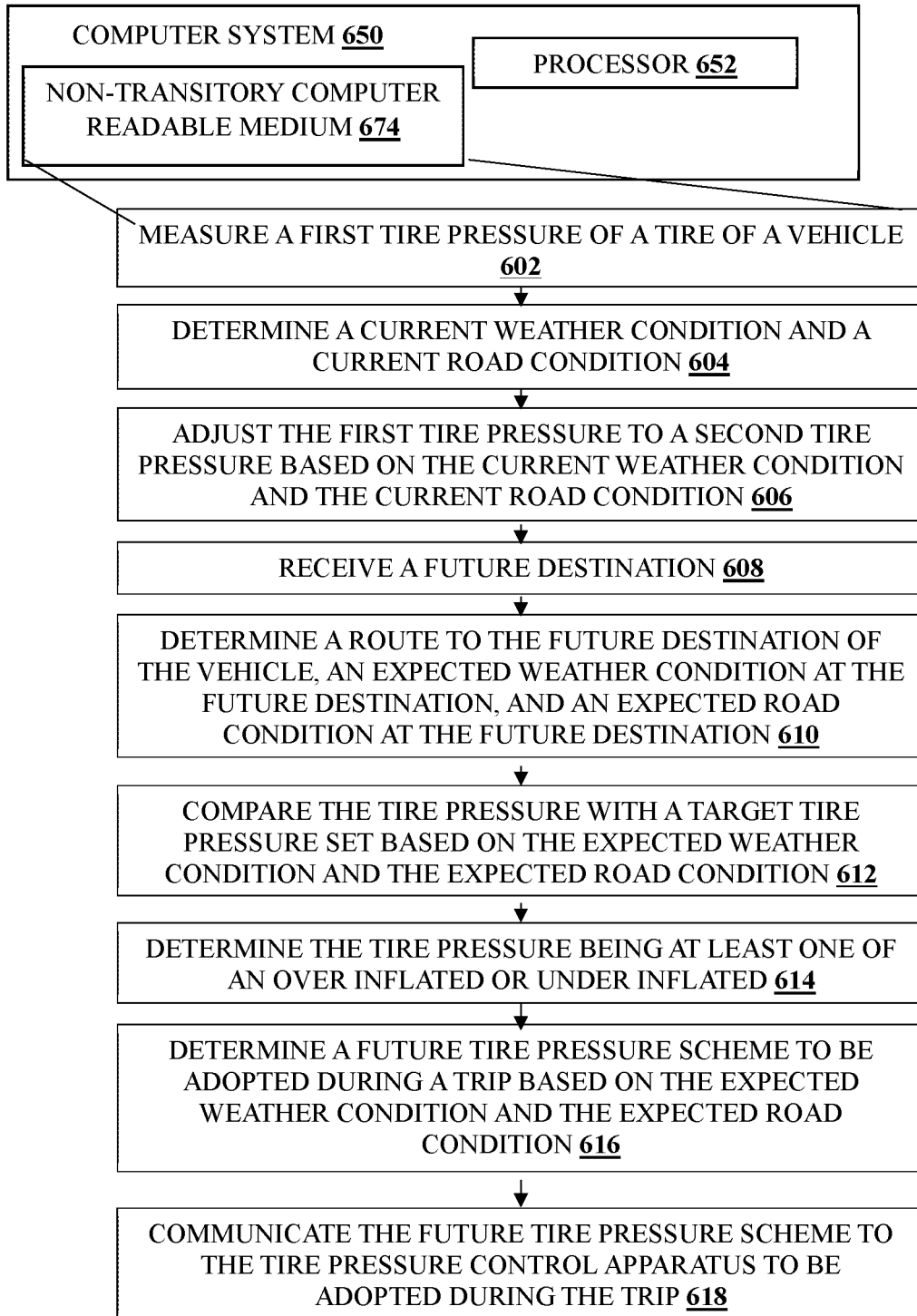

An embodiment relates to a non-transitory computer-readable medium for managing tire pressure of a tire associated with a vehicle, the non-transitory computer-readable medium comprising instructions executable by a processor to receive a route and a driving mode, to determine tire-specific information of a tire, to retrieve from an external database an upcoming road condition and an upcoming weather condition in a trip on the route, and to determine a tire pressure scheme based on the upcoming road condition and the upcoming weather condition, and to send a command to a tire pressure control apparatus to adjust a current tire pressure of the tire based on the tire pressure scheme. FIG. 6C shows a computer readable medium to store instructions for executing the method described in FIG. 6B. A computer system 650 comprises a processor 652 and a non-transitory computer readable medium 674 that stores instructions to execute the steps 602, 604, 608, 610, 612, 614, 616, and 618.

Figure 7A:
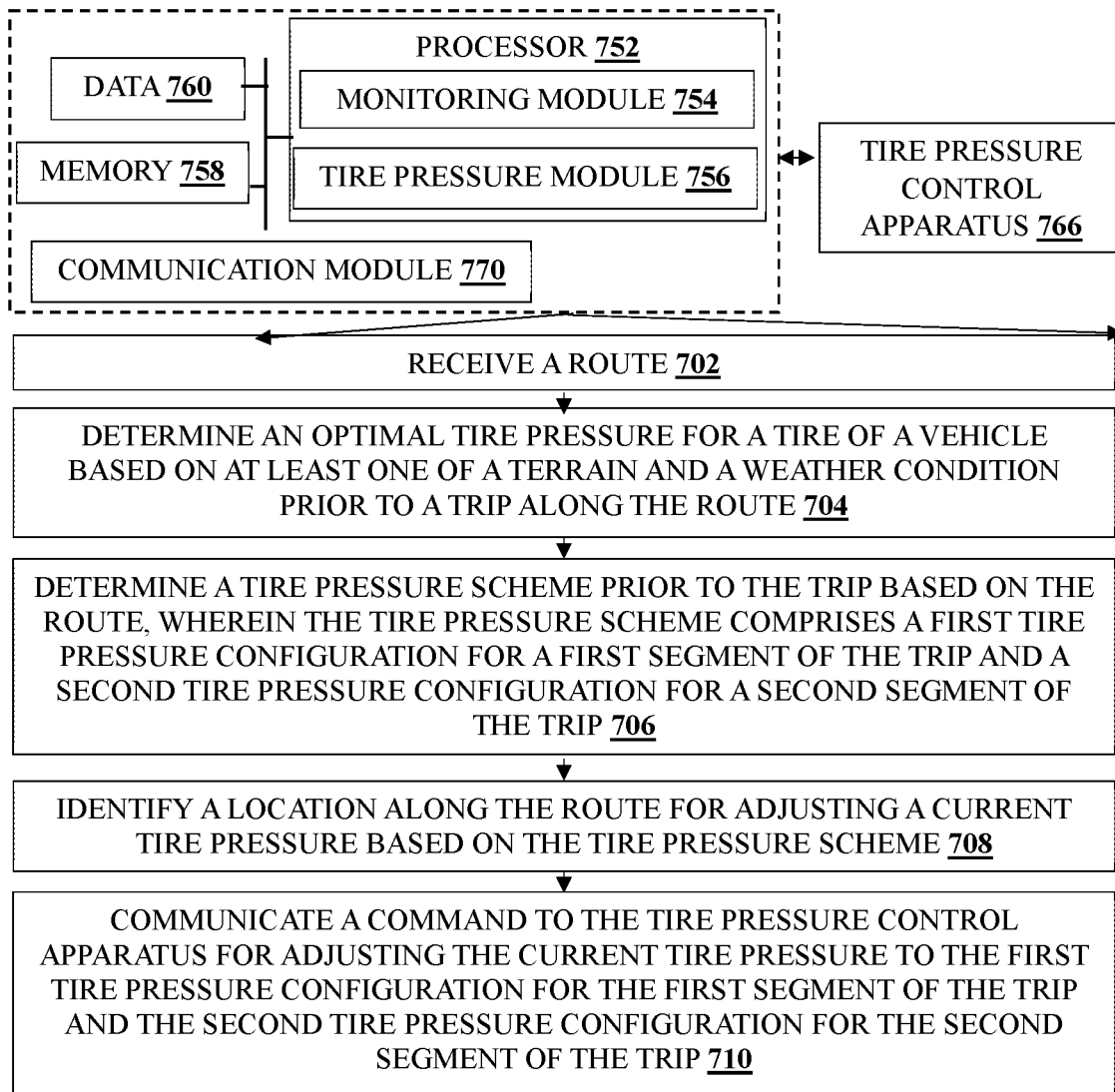
FIG. 7A, FIG. 7B, and FIG. 7C shows block diagrams of a system, method, and computer readable medium for tire pressure management respectively, according to one or more embodiments.

Referring to FIG. 7A, it shows a system for generating and managing a tire pressure scheme according to one or more embodiments. This system comprises a monitoring module 754, a tire pressure module 756, a tire pressure control apparatus 766, a communication module 770, a processor 752 and a memory 758. The memory contains a set of executable instructions that when executed by the processor, carry out operations with gathered data 760 that are described in FIG. 7B.

Figure 7B:
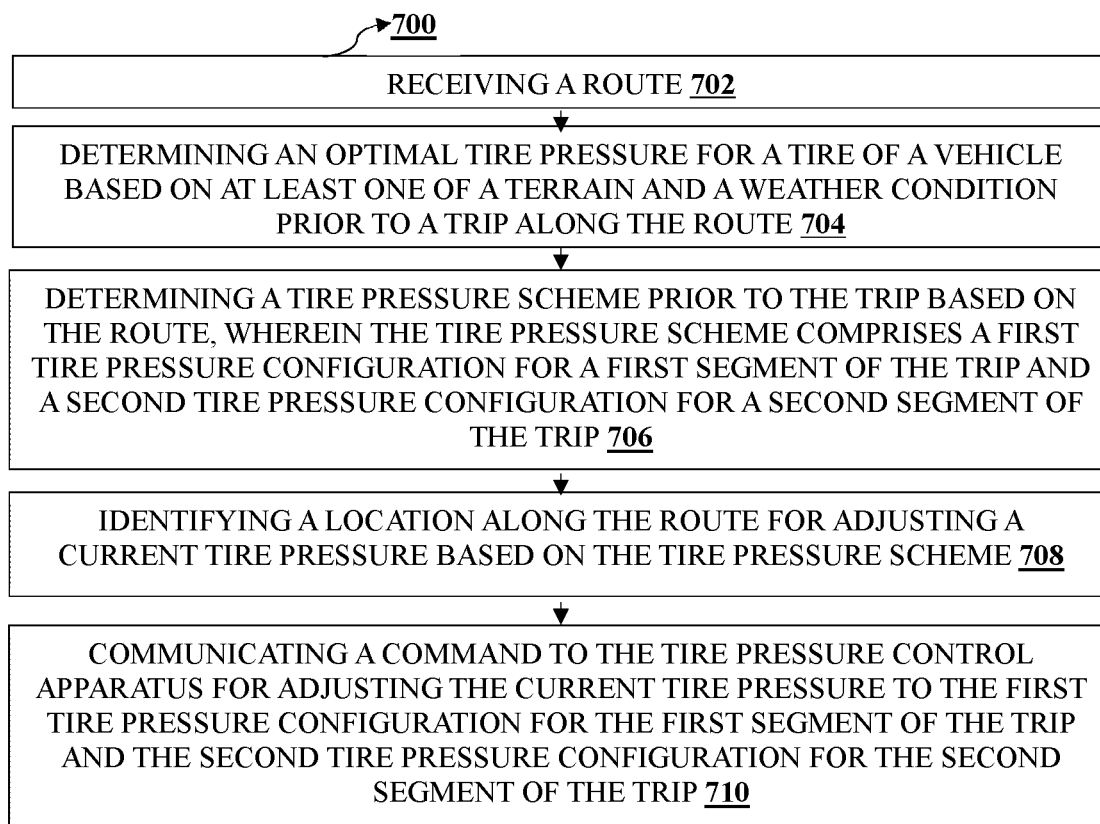

Referring to FIG. 7B, it shows a flowchart of a method for tire pressure management based on a tire pressure scheme, according to one or more embodiments.

In step 702, the method 700 comprises receiving a route.

In step 704, the method 700 comprises determining an optimal tire pressure for a tire of a vehicle based on at least one of a terrain and a weather condition prior to a trip along the route.

In step 706, the method 700 comprises determining a tire pressure scheme prior to the trip based on the route, wherein the tire pressure scheme comprises a first tire pressure configuration for a first segment of the trip and a second tire pressure configuration for a second segment of the trip.

In step 708, the method 700 comprises identifying a location along the route for adjusting a current tire pressure based on the tire pressure scheme.

In step 710, the method 700 comprises communicating a command to the tire pressure control apparatus for adjusting the current tire pressure to the first tire pressure configuration for the first segment of the trip and the second tire pressure configuration for the second segment of the trip.

Figure 7C:
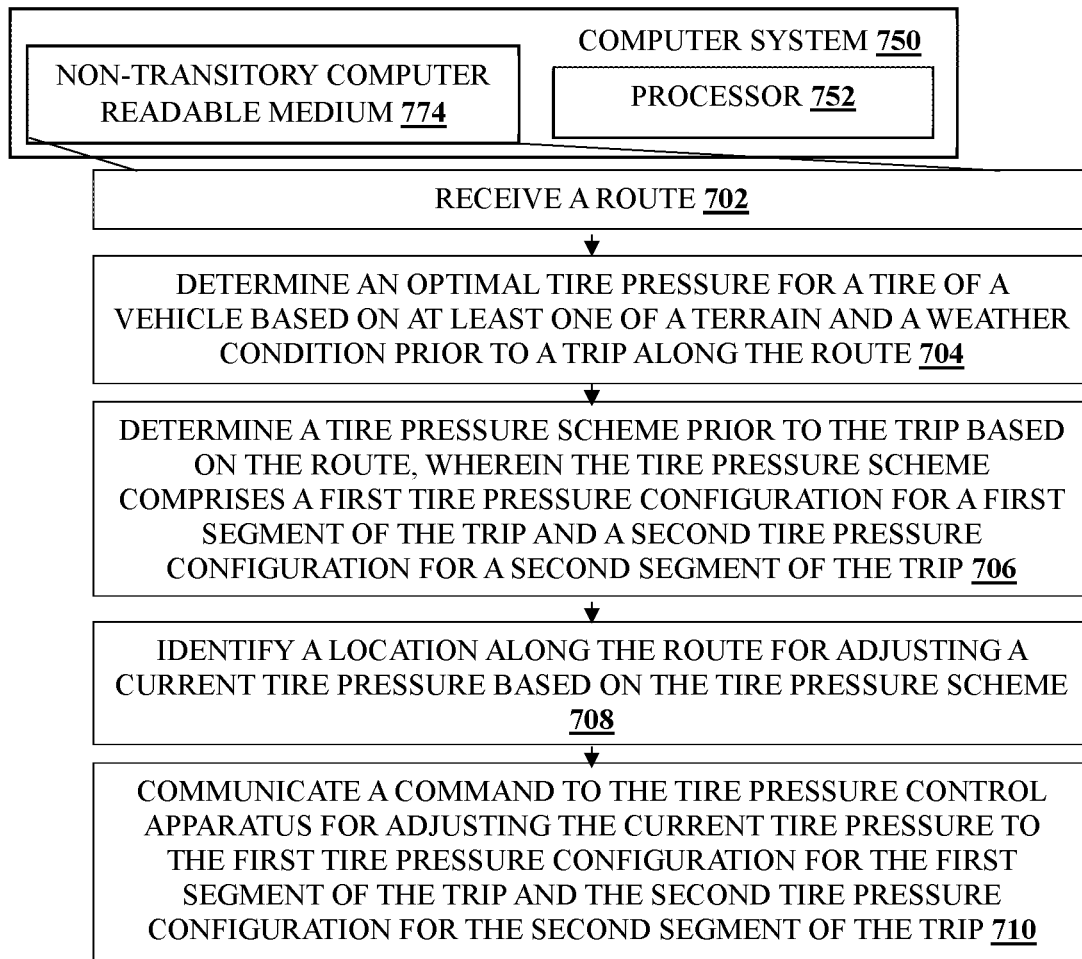

This scheme is designed to accommodate the different requirements for the first and second segments of the trip, including a first tire pressure configuration for the initial segment and a second tire pressure configuration for the latter part. FIG. 7C shows a computer readable medium to store instructions for executing the method described in FIG. 7B. A computer system 750 comprises a processor 752 and a non-transitory computer readable medium 774 that stores instructions to execute the steps 702, 704, 708, and 710.

An embodiment relates to a system comprising a monitoring module, a navigation module, a tire pressure module, a tire pressure control apparatus, a processor, and a memory coupled to the processor, the memory comprising instructions executable by the processor to receive a location for a destination, determine a current location, estimate a tire-wear status of a tire via the monitoring module, determine an optimal tire pressure of the tire, provide recommendation of a route via a navigation unit from the current location to the destination based on the optimal tire pressure, and determine a tire pressure scheme based on the optimal tire pressure and the route, and communicate a command to the tire pressure control apparatus to adjust a current tire pressure of the tire based on the tire pressure scheme.

Figure 8A:
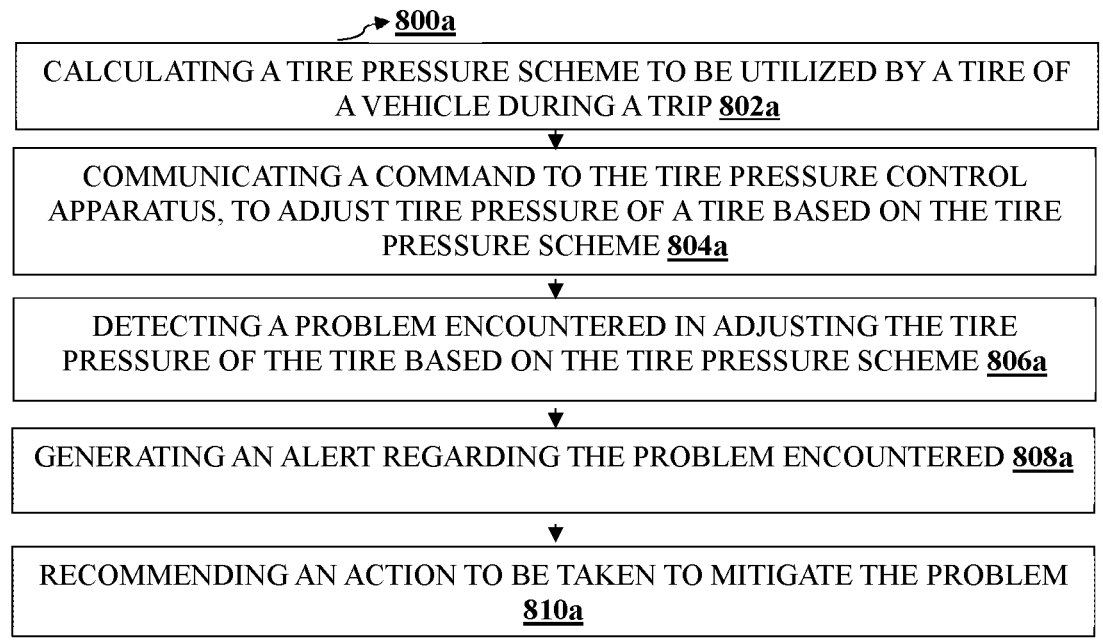
FIG. 8A shows a system for adaptive tire pressure control and recommendation of route according to one or more embodiments.

Referring to FIG. 8A, it shows a block diagram of a method for identifying a malfunction in tire pressure management according to one or more embodiments. The method 800a offers a comprehensive strategy for tire pressure management and problem resolution, enhancing both safety and vehicle performance during trips.

In step 802a, the method 800a comprises communicating a command to the tire pressure control apparatus, to adjust tire pressure of a tire based on the tire pressure scheme.

In step 804a, the method 800a comprises communicating a command to the tire pressure control apparatus, to adjust tire pressure of a tire based on the tire pressure scheme.

In step 806a, the method 800a comprises detecting a problem encountered in adjusting the tire pressure of the tire based on the tire pressure scheme.

In step 808a, the method 800a comprises recommending an action to be taken to mitigate the problem.

In step 810a, the method 800a comprises recommending an action to be taken to mitigate the problem.

Figure 8B:
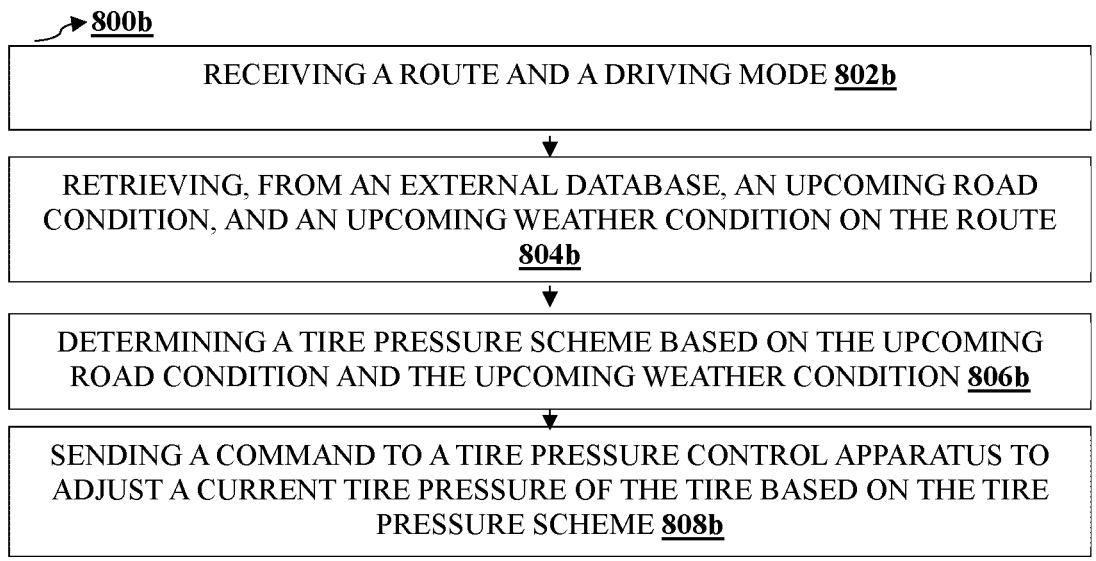
FIG. 8B shows a block diagram of a method for adaptive tire pressure control for a specific route, according to one or more embodiments.

Referring to FIG. 8B, it shows a block diagram of a method for adaptive tire pressure control for a specific route, according to one or more embodiments. Method 800b is a comprehensive and adaptable approach, ensuring that tire pressure remains optimized throughout the trip, regardless of the varying road and weather conditions or the chosen driving mode.

In step 802b, the method 800b comprises sending a command to a tire pressure control apparatus to adjust a current tire pressure of the tire based on the tire pressure scheme.

In step 804b, the method 800b comprises sending a command to a tire pressure control apparatus to adjust a current tire pressure of the tire based on the tire pressure scheme.

In step 806b, the method 800b comprises sending a command to a tire pressure control apparatus to adjust a current tire pressure of the tire based on the tire pressure scheme.

In step 808b, the method 800b comprises sending a command to a tire pressure control apparatus to adjust a current tire pressure of the tire based on the tire pressure scheme.

Figure 9A:
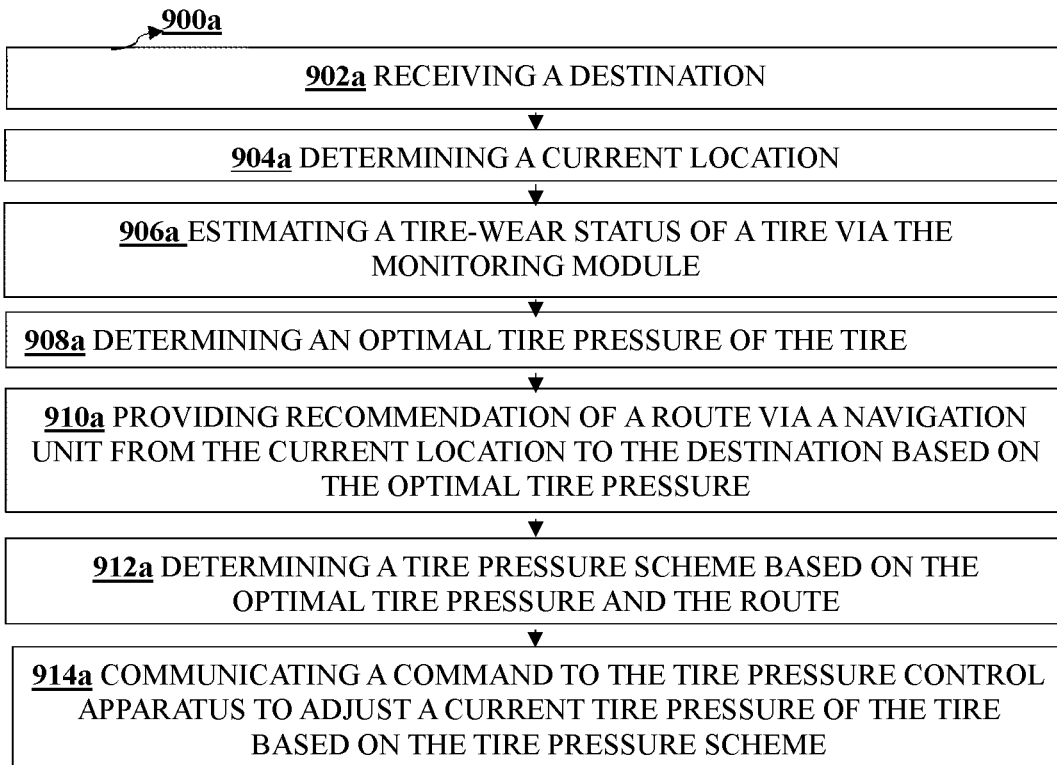
FIG. 9A shows a block diagram of a method for adaptive tire pressure control and recommendation of route, according to one or more embodiments.

Referring to FIG. 9A, it provides a flowchart for the method 900a presents an approach to optimize tire performance and enhance vehicle safety. In step 902a, the method 900a comprises receiving a destination. In step 904a, the method 900a comprises determining a current location. In step 906a, the method 900a comprises estimating a tire-wear status of a tire via the monitoring module. In step 908a, the method 900a comprises determining an optimal tire pressure of the tire. In step 910a, the method 900a comprises providing recommendation of a route via a navigation unit from the current location to the destination based on the optimal tire pressure. In step 912a, the method 900a comprises determining a tire pressure scheme based on the optimal tire pressure and the route. In step 914a, the method 900a comprises communicating a command to the tire pressure control apparatus to adjust a current tire pressure of the tire based on the tire pressure scheme.

In some embodiments, if the tire performance or the current tire pressure scheme cannot meet safety standards, the system alerts the driver. The driver may be advised to modify the route or driving habits to mitigate potential safety concerns associated with the tire conditions.

In some embodiments, if adjusting/not adjusting the tire pressure would compromise safety due to certain conditions, the system alerts the driver. For example, if road conditions or other factors make tire pressure adjustment unsafe, the system informs the driver of the potential risks.

In some embodiments, the system can automatically limit or prevent tire pressure adjustments when it detects that such adjustments could pose safety risks. This feature ensures that the system avoids making changes that could negatively impact vehicle safety.

In some embodiments, the system can adaptively modify the tire pressure scheme based on changes in driving habits or route adjustments made by a driver. This ensures that the tire pressure scheme remains aligned with safety considerations and evolving driving conditions.

In some embodiments, the processor is further operable to receive a control strategy, determine a driving habit that is compromising the control strategy, and recommend at least one of a change in the route and change of the driving habit that is reinforcing the control strategy. In some embodiments, the control strategy comprises one or more of energy efficiency, performance, and safety. In some embodiments, the processor is operable to recommend a tire-rotation based on the tire-wear status of the tire. In some embodiments, the processor is configured for recommending a replacement of the tire based on the tire-wear status of the tire. In some embodiments, the tire-wear status is determined by identifying a change in tire-features, the tire-feature comprising one or more of a tread depth, a tread wear indicator, an uneven wear pattern, a bald spot, a crack, a cut, a bulge, a tire age, a vibration, a handling issue, and a road noise. In some embodiments, the processor is operable to identify an unsafe tire pressure adjustment and restrict an adjustment of the current tire pressure when a potential risk is detected. In some embodiments, the processor is operable to adjust the tire pressure scheme based on a change in driving habit. In some embodiments, the processor is operable to adjust the tire pressure scheme based on a change in the route.

In some embodiments, the processor is operable to monitor a current tire pressure and a current tire performance and generate an alert if at least one of the current tire pressure or the current tire performance does not meet a safety standard, the safety standard comprising one or more of Federal Motor Vehicle Safety Standards, European Union Tire Labeling Regulation, manufacturer recommendations, industry standards, state regulations and local regulations.

In some embodiments, the command comprises one of a tire inflation command and a tire deflation command. In some embodiments, the tire pressure control apparatus is requested by the processor to generate a corrective tire pressure based on an expected road condition. In some embodiments, the tire pressure control apparatus is requested by the processor to generate the corrective tire pressure based on a change in weather condition.

An embodiment relates to a method comprising receiving a location for a destination, determining a current location, estimating a tire-wear status of a tire, determining an optimal tire pressure of the tire, recommending a route from the current location to the destination based on the optimal tire pressure, determining a tire pressure scheme based on the optimal tire pressure and the route, and communicating a command to a tire pressure control apparatus for adjustment of a current tire pressure of the tire based on the tire pressure scheme.

In some embodiments, the method further comprises receiving a control strategy, determining a driving habit that is compromising the control strategy, and recommending change in one of the route and the driving habit that is reinforcing the control strategy, and wherein the control strategy comprises one or more of energy efficiency, performance, and safety. In some embodiments, the tire pressure scheme is based on the control strategy. In some embodiments, adjusting the current tire pressure comprises deflating the tire. In some embodiments, adjusting the current tire pressure comprises inflating the tire. In some embodiments, the method further comprises restricting the adjustment of current tire pressure without receipt of an input from a driver.

An embodiment relates to a non-transitory computer-readable medium for managing tire pressure of a tire associated with a vehicle, the non-transitory computer-readable medium comprising instructions executed to: receive a location for a destination, determine a current location, estimate a tire-wear status of the tire, determine an optimal tire pressure of the tires, provide recommendation of a route via a navigation unit from the current location to the destination based on the optimal tire pressure, and determine a tire pressure scheme based on the optimal tire pressure and the route, and communicate a command to a tire pressure control apparatus to adjust a current tire pressure of the tire based on the tire pressure scheme.

An embodiment relates to a system comprising a monitoring module, a navigation module, a tire pressure module, a tire pressure control apparatus, a processor storing instructions in non-transitory memory that, when executed, cause the processor to monitor a first tire pressure of a tire of a vehicle, communicate a command to the tire pressure control apparatus to adjust the first tire pressure to a second tire pressure based on a road condition, and a weather condition, determine if a current tire pressure is less than the second tire pressure, and provide recommendation of a route when the current tire pressure is less than the second tire pressure. In an embodiment, the system assesses the wear of the tires, potentially using factors like tread level. Based on this assessment, the system generates recommendations for tire rotation or replacement to ensure optimal tire performance and safety.

In an embodiment, the processor is further operable to receive a control strategy, determine a driving habit that is compromising the control strategy, and recommend at least one of a change in the route and change of the driving habit that is reinforcing the control strategy. In another embodiment, the control strategy comprises one or more of energy efficiency, performance, and safety. In yet another embodiment, the processor is further operable to recommend a stop driving command if the control strategy is not received or the route is not available. In yet another embodiment, the processor is operable to determine a tire-wear status of the tire, and to recommend at least one of a change in tire rotation and a replacement of the tire based on the tire-wear status of the tire. In yet another embodiment, the tire-wear status is determined by identifying a change in tire-features, the tire-feature comprising one or more of a tread depth, a tread wear indicator, an uneven wear pattern, a bald spot, a crack, a cut, a bulge, a tire age, a vibration, a handling issue, and a road noise. In yet another embodiment, the processor is operable to identify an unsafe tire pressure adjustment and restrict an adjustment of the current tire pressure when a potential risk is detected. In yet another embodiment, the processor is operable to adjust the second tire pressure based on a change in driving habit. In yet another embodiment, the processor is operable to adjust the second tire pressure based on a change in the route. In yet another embodiment, the processor is operable to monitor the current tire pressure and a current tire performance, and generate an alert if at least one of the current tire pressure and the current tire performance does not meet a safety standard, the safety standard comprising one or more of Federal Motor Vehicle Safety Standards, European Union Tire Labeling Regulation, manufacturer recommendations, industry standards, state regulations and local regulations. In yet another embodiment, the command comprises one of a tire inflation command and a tire deflation command. In yet another embodiment, the tire pressure control apparatus is modified by the processor to generate a corrective tire pressure based on an expected road condition. In yet another embodiment, the tire pressure control apparatus is modified by the processor to generate the corrective tire pressure based on a change in weather condition.

An embodiment relates to a method comprising monitoring a first tire pressure of a tire of a vehicle, communicating a command to the tire pressure control apparatus to adjust the first tire pressure to a second tire pressure based on a road condition, and a weather condition, determining if a current tire pressure is less than the second tire pressure, and recommending a route when the current tire pressure is less than the second tire pressure.

Figure 9B:
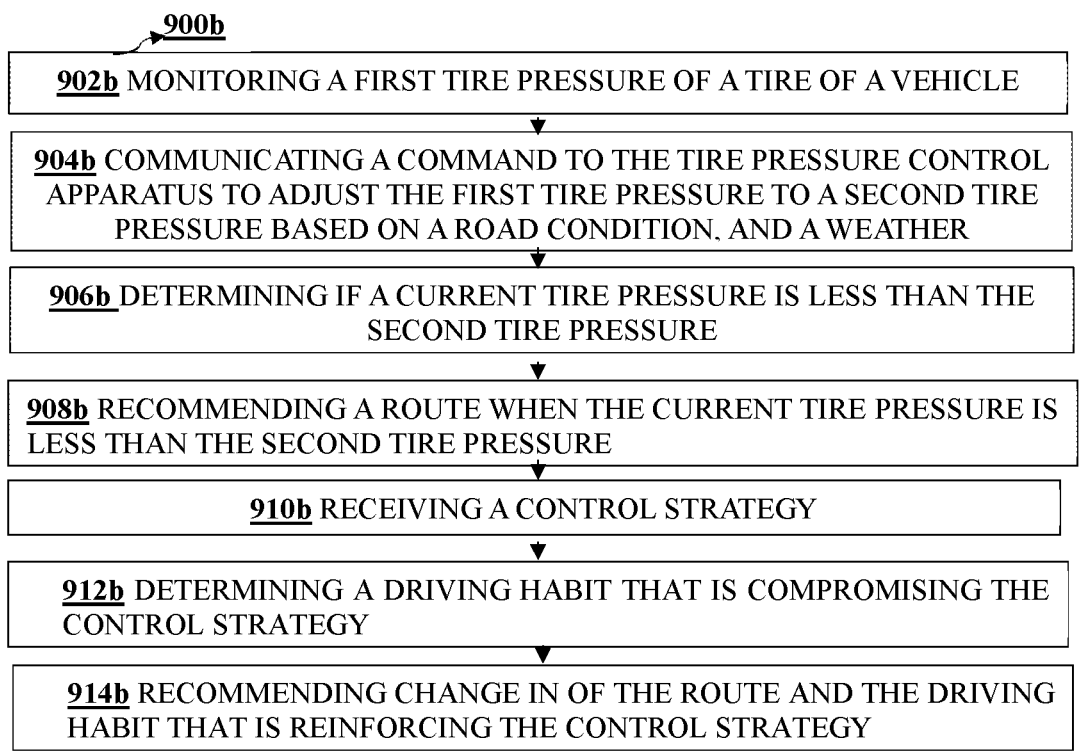
FIG. 9B shows a block diagram of a method for identifying a malfunction in tire pressure adjustment and providing recommendations to mitigate the malfunction, according to one or more embodiments.

Referring to FIG. 9B, it provides a flowchart of a method for identifying a malfunction in tire pressure adjustment and providing recommendations to mitigate the malfunction, according to one or more embodiments. In step 902b, the method 900b comprises monitoring a first tire pressure of a tire of a vehicle. In step 904b, the method 900b comprises communicating a command to the tire pressure control apparatus to adjust the first tire pressure to a second tire pressure based on a road condition, and a weather condition. In step 906b, the method 900b comprises determining if a current tire pressure is less than the second tire pressure. In step 908b, the method 900b comprises recommending a route when the current tire pressure is less than the second tire pressure. In step 910b, the method 900b comprises receiving a control strategy. In step 912b, the method 900b comprises determining a driving habit that is compromising the control strategy. In step 914b, the method 900b comprises recommending at least one of a change of the route and a change in the driving habit that is reinforcing the control strategy. The control strategy comprises one or more of energy efficiency, performance, and safety.

An embodiment relates to a non-transitory computer-readable medium for managing tire pressure of a tire associated with a vehicle, the non-transitory computer-readable medium comprising instructions executed to monitor a first tire pressure of a tire of a vehicle, communicate a command to the tire pressure control apparatus to adjust the first tire pressure to a second tire pressure based on a road condition, and a weather condition, determine if a current tire pressure is less than the second tire pressure, and provide recommendation of a route when the current tire pressure is less than the second tire pressure.

An embodiment relates to a system comprising a monitoring module, a communication device comprising an inter-vehicle communication module, a communication relay facility that relays communication between the system and a nearby vehicle by communicating with the communication device, a processor; and a memory coupled to the processor, the memory comprising instructions executable by the processor to determine a first tire pressure scheme prior to a trip based on a tire pressure affecting parameter, receive real-time tire pressure data from a nearby vehicle, determine a second tire pressure scheme based on the real-time tire pressure data, adjust the first tire pressure scheme to the second tire pressure scheme, and broadcast, via the communication module, an effect of the second tire pressure scheme to the nearby vehicle. The system is an advanced adaptive tire pressure control system that creates a dynamic and adaptive approach to tire pressure management.

Figure 10A:
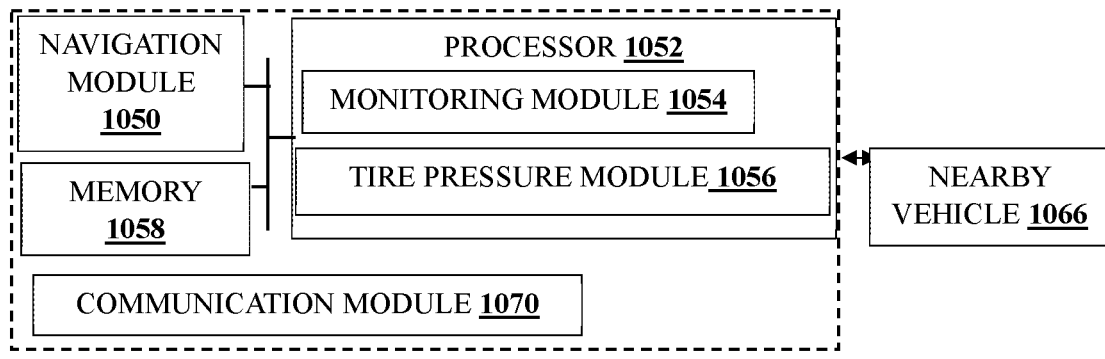
FIG. 10A shows a system utilizing real-time data to adjust tire pressure on-the-fly, according to one or more embodiments.

Referring to FIG. 10A, it shows a system utilizing real-time data to adjust tire pressure on-the-fly, according to one or more embodiments. This system comprises a monitoring module 1054, a tire pressure module 1056, a communication device equipped with an inter-vehicle communication module 1070, and a communication relay facility responsible for transmitting information between the system and neighboring vehicles via interaction with the communication device. Furthermore, the system includes a navigation module 1050, a processor 1052 and a memory 1058 coupled to the processor 1052. Within memory 1058, a set of instructions is stored, which are executable by the processor 1052. The processor is operable to perform steps described in FIG. 10B.

This system utilizes real-time data 1060 from nearby vehicles, incorporates information from various sensors, and adjusts tire pressure on-the-fly to optimize performance, fuel efficiency, and safety based on evolving road conditions and vehicle behavior. The system continuously monitors the road conditions, tire performance, and other relevant factors. It receives real-time data from nearby vehicles that have traveled a similar road section ahead, including information about tire pressure, weight, speed, tire conditions, and slippage. As the vehicle approaches a specific road segment, the system starts receiving real-time tire pressure data and related information from other vehicles traveling ahead on the same side of the road. This data includes details about how other vehicles are performing and how their tire pressure adjustments are affecting their performance. Using the real-time data received from other vehicles, the system modifies the current tire pressure scheme to be utilized on the vehicle. The system takes into account factors like weight, speed, tire conditions, and slippage to optimize tire pressure for performance, fuel efficiency, and safety. The system broadcasts the effect of using its own modified tire pressure scheme to other vehicles. This communication allows nearby vehicles to anticipate changes in the vehicle's behavior due to tire pressure adjustments. The adaptive tire pressure scheme utilizes a variety of sensors such as cameras, tire friction and slippage data, speed sensors, and more. The system evaluates this sensor data to determine if tire pressure adjustments are necessary for achieving performance, fuel efficiency, or safety goals. The adaptive tire pressure scheme can override any pre-calculated tire pressure schemes that were previously determined based on static data or initial planning. This ensures that real-time conditions and dynamic factors are given priority in determining the most suitable tire pressure for the current situation.

In some embodiments, the inter-vehicle communication module comprises a communication protocol, a networking stack, a security software, a geospatial software, a data storage, and an integration software.

In some embodiments, the communication protocol comprises one or more of Dedicated Short-Range Communications (DSRC) and Cellular Vehicle-to-Everything (C-V2X) technologies. In some embodiments, the real-time tire pressure data comprises a tire pressure scheme of the nearby vehicle. In some embodiments, the real-time tire pressure data further comprises relevant information comprising an upcoming weather condition, an upcoming road condition, an upcoming altitude change, a driving speed, and a driving style. In some embodiments, the communication device is a wireless communication device. In some embodiments, the monitoring module comprises a tire pressure monitoring module. In some embodiments, the processor is further operable to monitor the road conditions in real-time via the monitoring module of the system. In some embodiments, the processor is further operable to monitor a weather condition in real-time via the monitoring module of the system. In some embodiments, the processor is further operable to monitor tire performance and the relevant information via the monitoring module of the system. In some embodiments, the processor is further operable to determine if a tire pressure adjustment is required to achieve a selected control strategy based on one or more of a route, a tire condition, available energy source, real-time road condition and real-time weather condition, and override one of the first tire pressure scheme and the second tire pressure scheme with a third tire pressure scheme based on a selected control strategy. In some embodiments, the effect is one of a change in traction, a change in shock absorption, a change in tire wear, a change in grip in cornering, a change in fuel efficiency, a change in stability, a change in agility, a change in risk of blow out, a change in braking distance, and a change in heat built up.

Figure 10B:
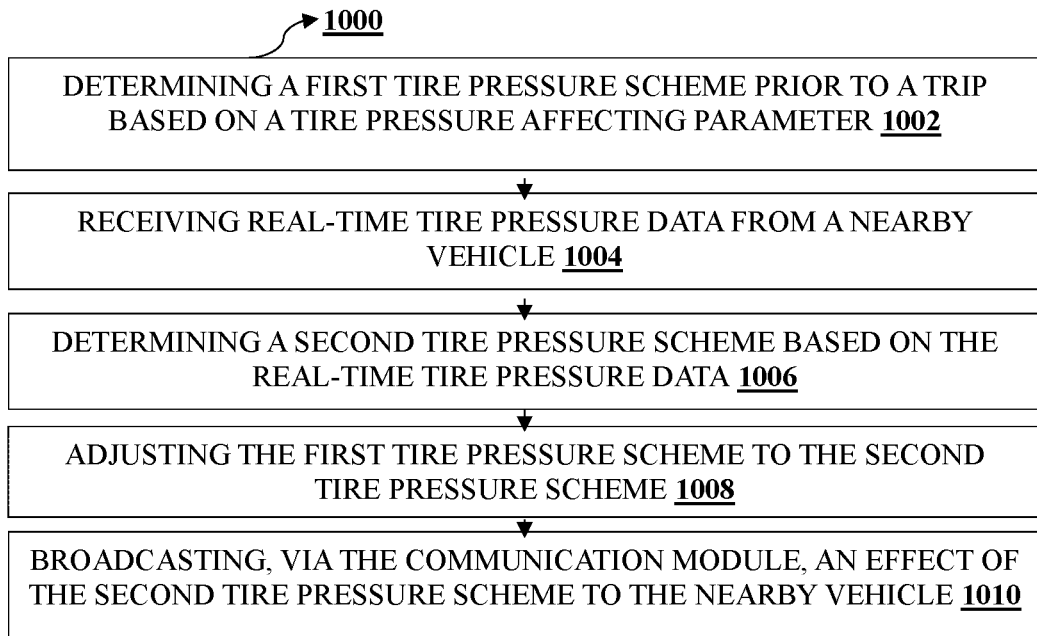
FIG. 10B shows flowchart of a method for managing tire pressure via information from a nearby vehicle, according to one or more embodiments.

Referring to FIG. 10B, it provides a flowchart for tire pressure management based on data received from a nearby vehicle, according to one or more embodiments. In step 1002, the method 1000 comprises determining a first tire pressure scheme prior to a trip based on a tire pressure affecting parameter sets. In step 1004, the method 1000 comprises receiving real-time tire pressure data from a nearby vehicle 1066. In step 1006, the method 1000 comprises determining a second tire pressure scheme based on the real-time tire pressure data. In step 1008, the method 1000 comprises adjusting the first tire pressure scheme to the second tire pressure scheme. In step 1010, the method 1000 comprises broadcasting, via the communication module, an effect of the second tire pressure scheme to the nearby vehicle.

Figure 11:
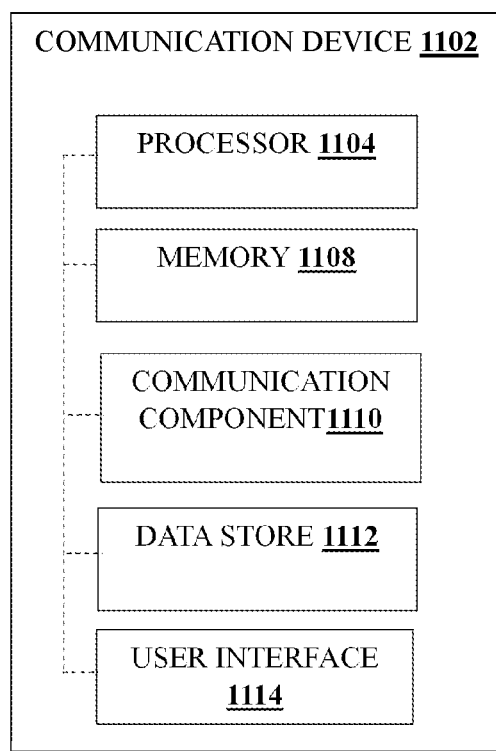
FIG. 11 shows a communication device associated with a vehicle's system and/or an external device, according to one or more embodiments.

Referring to FIG. 11, the communication device 1102 may be associated with a vehicle's system and/or an external device (e.g., a mobile communication device that may be carried by a driver). In some aspects, the communication device 1102 may include additional components which may be implemented in specially programmed computer readable instructions or code, firmware, hardware, or some combination thereof.

In an aspect, features described herein with respect to the functions of communication device 1102 in communicating with tire pressure management system, a network management center 1130, and/or optimum tire pressure determiner component may be implemented in, or executed, using one or any combination of processor 1104, memory 1108, communications component 1110, and data store 1112. For example, communication component 1110 may be defined or otherwise programmed as one or more processor components of processor 1104. Further, for example, communication component 1110 may be defined as a computer-readable medium (e.g., a non-transitory computer-readable medium) stored in memory 1108 and/or data store 1112 and executed by processor 1104. Moreover, for example, inputs and outputs relating to operations of the communication component 1110 may provide a bus between the components of a computer device or an interface for communication with external devices or components. Processor 1104 can include a single or multiple set of processors or multi-core processors. Moreover, processor 1104 can be implemented as an integrated processing system and/or a distributed processing system.

Communications component 1110 is operable to establish and maintain communications with one or more internal components or external devices utilizing hardware, software, and services as described herein. For example, the communications component 1110 may establish communication with a tire inflation device or a Network Management Center (NMC) device 1130. The communication component 1110 may further carry communications between components on the communication device 1102, as well as between user and external devices, such as devices located across a communications network, and/or devices serially, or locally connected to communication device 1102. For example, communications component 1110 may include one or more buses, and may further include transmit chain components and receive chain components associated with a transmitter and receiver, respectively, or a transceiver, operable for interfacing with external devices.

Additionally, data store 1112, which can be any suitable combination of hardware and/or software, provides for mass storage of information, databases, and programs employed in connection with aspects described herein. For example, data store 1112 may be a data repository for applications not currently being executed by processor 1104.

The communication device 1102 may additionally include a user interface 1114 operable to receive inputs from a user, and further operable to generate outputs for presentation to the user. User interface 1114 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 1114 may include one or more output devices, including but not limited to a display, a speaker, a haptic feedback mechanism, a printer, any other mechanism capable of presenting an output to a user, or any combination thereof.

In some embodiments, the processor identifies multiple vehicular communication devices within a cluster of cooperating devices, determines the allocation of channel resources for these devices which can include resources for different radio communication technologies, and transmits the channel resource allocations to the vehicular communication devices. In some embodiments, the communication device may include additional components such as a digital signal processor, a radio transceiver, and antennas, which are used to transmit the channel resource allocations as wireless radio signals. It supports multiple vehicular radio communication technologies, such as Dedicated Short-Range Communications (DSRC) and Long Term Evolution (LTE) Vehicle-to-Vehicle (V2V) or Vehicle-to-Everything (V2X). Different radio communication technologies may use different channel access schemes, like contention-based or deterministic scheduling. In some embodiments, the communication device can create a cluster of cooperating vehicular communication devices by sending a "create cluster" message and receiving "cluster accept" messages from other devices in the vicinity. It can also exchange signaling to select a cluster head for the cluster. In some embodiments, the communication device can receive instructions from a control node to form a cluster. In some embodiments, the communication device can receive "cluster decline" messages and reject additional vehicular communication devices from joining the cluster based on various factors like current travel lane, route, destination, device type, or supported radio technology. The processor can allocate specific channel resources for each vehicular communication device within the cluster. In some embodiments, the communication device can periodically update and transmit new channel resource allocations to the devices in the cluster. In some embodiments, the communication device can exchange signaling with the cluster head of another cluster to determine channel resource allocations based on this signaling. In some embodiments, the channel resource allocations can instruct devices to perform greedy spectrum selection, where they compete for the least-used channel resources for communication.

Figure 12:
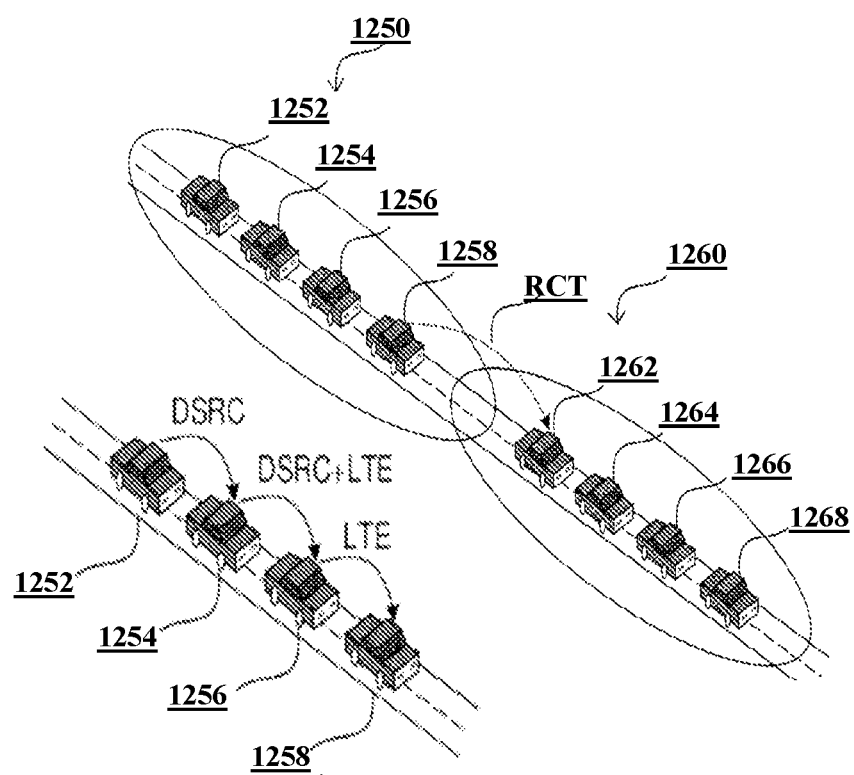
FIG. 12 shows vehicular communication devices cluster, according to one or more embodiments.

As shown in FIG. 12, cluster 1250 may include vehicular communication devices 1252, 1254, 1256, and 1258, while cluster 1260 may include vehicular communication devices 1262, 1264, 1266, and 1268. The vehicular communication devices of clusters 1250 and 1260 may coordinate to manage access to channel resources that can be shared between multiple vehicular radio communication technologies (RCT), such as DSRC, LTE V2V/V2X, and any other vehicular radio communication technologies. In certain cases, this cluster-based distributed channel access approach can facilitate efficient management and sharing of channel resources even when no central or coordinated infrastructure is available to perform. Although shown as the same type of vehicular communication device (e.g., automobiles) in FIG. 11, these exemplary and vehicular communication devices 1252, 1254, 1256, and 1258 and vehicular communication devices 1262, 1264, 1266, and 1268 may be the same or may be different types of vehicular communication devices.

Figure 13:
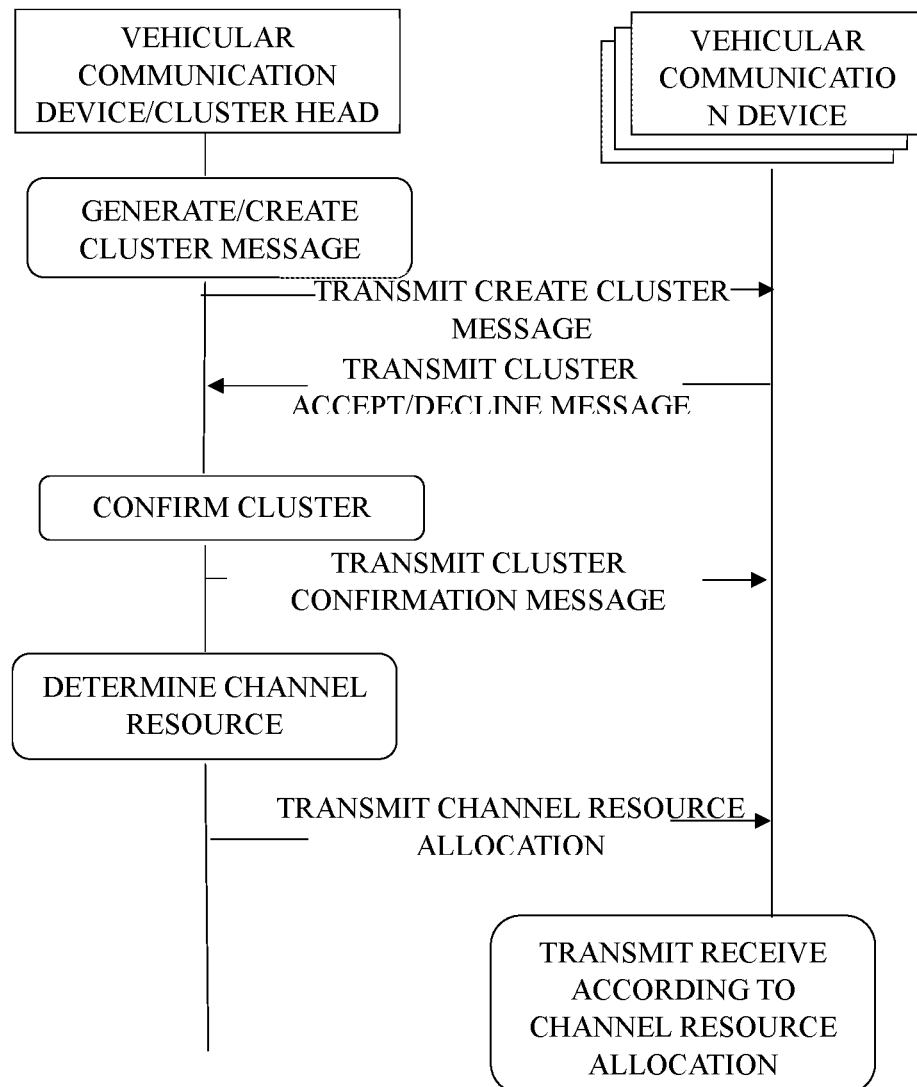
FIG. 13 shows an example of vehicular communication via dual communication technology, according to one or more embodiments.

Referring to FIG. 13, a cluster head uses a first communication technology like DSRC to transmit cluster signaling. A vehicular communication device, capable of both the first technology (DSRC) and a second technology (LTE V2V/V2X), relays the cluster signaling using both technologies. Another vehicular communication device, supporting at least the second technology (LTE V2V/V2X), receives the cluster signaling via either the first or second technology and then relays it using the second technology. Finally, a fourth vehicular communication device, which supports only the second technology, receives the cluster signaling using the second technology.

In an embodiment, a cluster head uses the first technology (DSRC) to transmit cluster signaling. A vehicular communication device, capable of both the first technology (DSRC) and the second technology (LTE V2V/V2X), relays the cluster signaling using both technologies. Another vehicular communication device, supporting only the first technology (DSRC), receives the cluster signaling using the first technology. Yet another vehicular communication device, supporting only the second technology (LTE V2V/V2X), receives the cluster signaling using the second technology.

Figure 14:
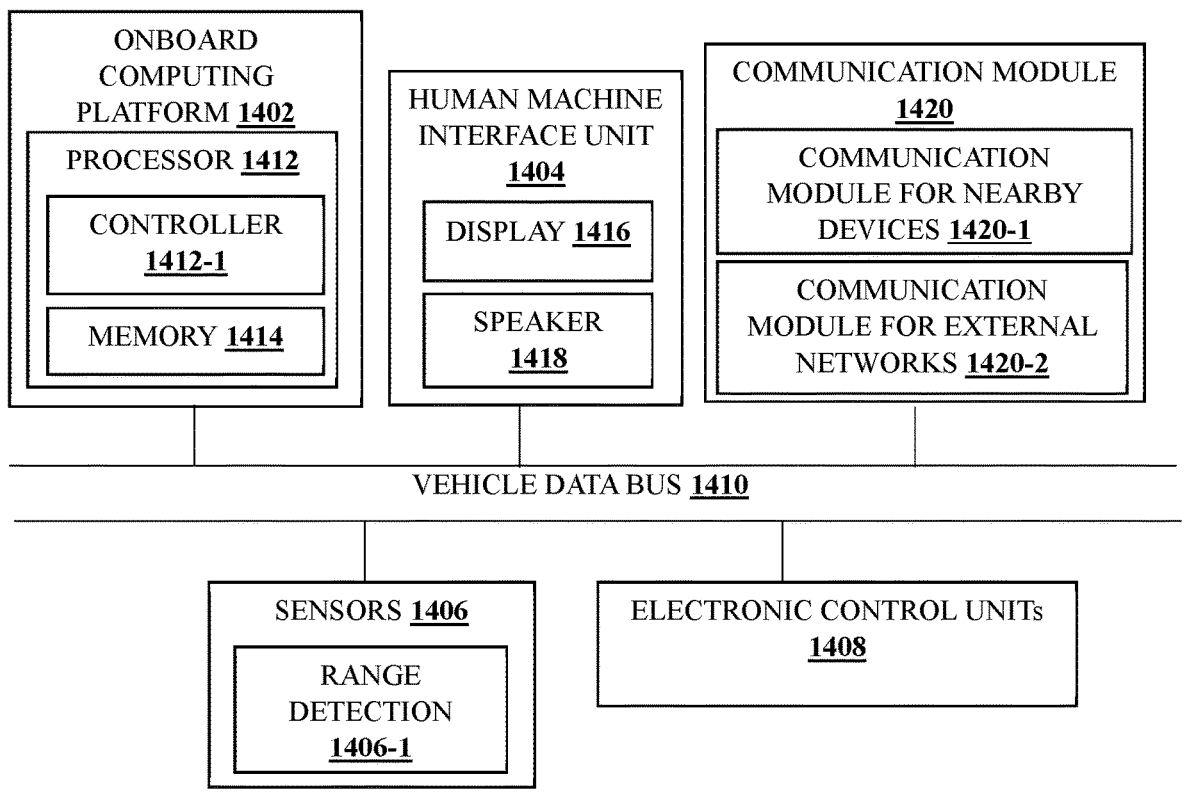
FIG. 14 shows a block diagram of electronic components of a vehicle according to an embodiment.

FIG. 14 is a block diagram of electronic components of a vehicle. In the illustrated example, the electronic components include an onboard computing platform 1402, a human-machine interface (HMI) unit 1404, the communication module 1420, sensors 1406, electronic control units (ECUs) 1408, and a vehicle data bus 1410.

The onboard computing platform 1402 includes a processor 1412 (also referred to as a microcontroller unit or a controller) and memory 1414. In the illustrated example, the processor 1412 of the onboard computing platform 1402 is structured to include the controller 1412-1. In other examples, the controller 1412-1 is incorporated into another ECU with its own processor and memory. The processor 1412 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 1414 includes multiple kinds of memory, particularly volatile memory, and non-volatile memory. The instructions reside completely, or at least partially, within any one or more of the memory 1414, the computer readable medium, and/or within the processor 1412 during execution of the instructions.

The HMI unit 1404 provides an interface between the vehicle and a user. The HMI unit 1404 includes digital and/or analog interfaces (e.g., input devices and output devices) to receive input from, and display information for, the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), haptic devices, actuators, a display 1416 (e.g., a heads-up display, a center console display such as a liquid crystal display (LCD), an organic light emitting diode (OLED) display, a flat panel display, a solid state display, etc.), and/or a speaker 1418. For example, the display 1416, the speaker 1418, and/or other output device(s) of the HMI unit 1404 are configured to emit an alert, such as an alert to change the tire rotation or the tire, to an operator (e.g., a driver) of the vehicle. Further, the HMI unit 1404 of the illustrated example includes hardware (e.g., a processor or controller, memory, storage, etc.) and software (e.g., an operating system, etc.) for an infotainment system that is presented via the display 1416.

The sensors 1406 are arranged in and/or around the vehicle to monitor properties of the vehicle and/or an environment in which the vehicle is located. One or more of the sensors 1406 may be mounted to measure properties around an exterior of the vehicle. Additionally, or alternatively, one or more of the sensors 1406 may be mounted inside a cabin of the vehicle or in a body of the vehicle (e.g., an engine compartment, wheel wells, etc.) to measure properties of the vehicle and/or interior of the vehicle. For example, the sensors 1406 include accelerometers, odometers, tachometers, pitch and yaw sensors, wheel speed sensors, microphones, tire pressure sensors, biometric sensors, ultrasonic sensors, infrared sensors, Light Detection and Ranging (lidar), Radio Detection and Ranging System (radar), Global Positioning System (GPS), cameras and/or sensors of any other suitable type. In the illustrated example, the sensors 1406 include the range-detection sensors 1406-1 that are operable to monitor object(s) located within a surrounding area of the vehicle.

The ECUs 1408 monitor and control the subsystems of the vehicle. For example, the ECUs 1408 are discrete sets of electronics that include their own circuit(s) (e.g., integrated circuits, microprocessors, memory, storage, etc.) and firmware, sensors, actuators, and/or mounting hardware. The ECUs 1408 communicate and exchange information via a vehicle data bus (e.g., the vehicle data bus 1410). Additionally, the ECUs 1408 may communicate properties (e.g., status of the ECUs, sensor readings, control state, error, and diagnostic codes, etc.) and/or receive requests from each other. For example, the vehicle may have dozens of the ECUs that are positioned in various locations around the vehicle and are communicatively coupled by the vehicle data bus 1410.

The vehicle data bus 1410 communicatively couples the communication module 1420, the onboard computing platform 1402, the HMI unit 1404, the sensors 1406, and the ECUs 1408. In some examples, the vehicle data bus 1410 includes one or more data buses. The vehicle data bus 1410 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

The communication module 1420-1 is operable to communicate with other nearby communication devices. In the illustrated example, the communication module 1420 includes a dedicated short-range communication (DSRC) module. A DSRC module includes antenna(s), radio(s) and software to communicate with nearby vehicle(s) via vehicleto-vehicle (V2V) communication, infrastructure-based module(s) via vehicle-to-infrastructure (V2I) communication, and/or, more generally, nearby communication device(s) (e.g., a mobile device-based module) via vehicle-to-everything (V2X) communication.

V2V communication allows vehicles to share information such as speed, position, direction, and other relevant data, enabling them to cooperate and coordinate their actions to improve safety, efficiency, and mobility on the road. It may rely on dedicated short-range communication (DSRC) and other wireless protocols that enable fast and reliable data transmission between vehicles. V2V communication, which is a form of wireless communication between vehicles that allows vehicles to exchange information and coordinate with other vehicles on the road. V2V communication enables vehicles to share data about their location, speed, direction, acceleration, and braking with other nearby vehicles, which can help improve safety, reduce congestion, and enhance the efficiency of transportation systems.

V2V communication is typically based on wireless communication protocols such as Dedicated Short-Range Communications (DSRC) or Cellular Vehicle-to-Everything (C-V2X) technology. With V2V communication, vehicles can receive information about potential hazards, such as accidents or road closures, and adjust their behavior accordingly. V2V communication can also be used to support advanced driver assistance systems (ADAS) and automated driving technologies, such as platooning, where a group of vehicles travel closely together using V2V communication to coordinate their movements.

More information on the DSRC network and how the network may communicate with vehicle hardware and software is available in the U.S. Department of Transportation's Core June 2011 System at Requirements Specification (SyRS) report (available http://wwwits.dot.gov/meetings/pdf/CoreSystemSESyRSRevA%20(2011-06-13).pdf).

DSRC systems may be installed on vehicles and along roadsides on infrastructure. DSRC systems incorporating infrastructure information are known as a "roadside" system. DSRC may be combined with other technologies, such as Global Position System (GPS), Visual Light Communications (VLC), Cellular Communications, and short-range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system, it is also meant to cover dedicated wireless communication systems between vehicles and roadside infrastructure systems, which are integrated with GPS and are based on an IEEE 802.11 protocol for wireless local area networks (such as 802.11p, etc.).

Additionally, or alternatively, the communication module 1420-2 includes a cellular vehicle-to-everything (C-V2X) module. A C-V2X module includes hardware and software to communicate with other vehicle(s) via V2V communication, infrastructure-based module(s) via V2I communication, and/or, more generally, nearby communication devices (e.g., mobile device-based modules) via V2X communication. For example, a C-V2X module is operable to communicate with nearby devices (e.g., vehicles, roadside units, mobile devices, etc.) directly and/or via cellular networks. Currently, standards related to C-V2X communication are being developed by the 3rd Generation Partnership Project.

The communication module 1420-2 is operable to communicate with external networks. For example, the communication module 1420-2 includes hardware (e.g., processors, memory, storage, antenna, etc.) and software to control wired or wireless network interfaces. In the illustrated example, the communication module 1420-2 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication module 1420-2 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

In an embodiment, the communication module is enabled for an autonomous communication, wherein the autonomous communication comprises communication over a period with minimal supervision under different scenarios. The communication module comprises a hardware component comprising a vehicle gateway system comprising a microcontroller, a transceiver, a power management integrated circuit, an Internet of Things device capable of transmitting one of an analog and a digital signal over one of a telephone, a communication, either wired or wirelessly.

In operation, according to an embodiment, the communication module 1420-1 performs V2V communication with an adjacent vehicle. For example, the communication module 1420-1 collects data from the adjacent vehicle that identifies (i) whether the adjacent vehicle includes an autonomous and/or semi-autonomous system (e.g., ADAS), (ii) whether the autonomous and/or semi-autonomous system is active, (iii) whether a manual takeover request of the autonomous and/or semi-autonomous system has been issued, (iv) lane-detection information of the adjacent vehicle, (v) a speed and/or acceleration of the adjacent vehicle, (vi) a (relative) position of the adjacent vehicle, (vii) a direction-of-travel of the adjacent vehicle, (viii) a steering angle rate-of-change of the adjacent vehicle, (ix) dimensions of the adjacent vehicle, (x) whether the adjacent vehicle is utilizing stability control system(s) (e.g., anti-lock braking, traction control, electronic stability control, etc.), and/or any other information that facilitates the controller 1412-1 in monitoring the adjacent vehicles.

The communication module enables in-vehicle communication, communication with other vehicles, infrastructure communication, grid communication, etc., using Vehicle to network (V2N), Vehicle to infrastructure (V2I), Vehicle to vehicle (V2V), Vehicle to cloud (V2C), Vehicle to pedestrian (V2P), Vehicle to device (V2D), Vehicle to grid (V2G) communication systems. For example, if a child stopped breathing for some reason, during a trip in a vehicle or car, first, the system detects that a health emergency has happened. Then, the system notifies nearby or surrounding vehicles or vehicles communicating with the vehicle's communication module. The vehicle uses, for example, a message protocol, a message that goes to the other vehicles via a broadcast.

In an embodiment, a connection is established between a vehicle and a nearby vehicle, which is a surrounding car. A nearby vehicle is detected by the vehicle control system. The nearby vehicle is detected by exchanging handshaking signals. The handshaking is the automated process for negotiation of setting up a communication channel between entities. The processor sends a start signal through the communication channel in order to detect a nearby vehicle. If there is a nearby vehicle, the processor may receive an acknowledgement signal from the nearby vehicle. Upon receiving the acknowledgement signal, the processor establishes a secured connection with the nearby vehicle. The processor may receive a signal at the communication module from the nearby vehicle. The processor may further automatically determine the origin of the signal. The processor communicatively connects the communication module to the nearby vehicle. Then the processor is operable to send and/or receive a message to and/or from the nearby vehicle. The signals received by the communication module may be analyzed to identify the origin of the signal to determine a location of the nearby vehicle.

In an embodiment, the system is enabled for bidirectional communication. The system sends a signal and then receives a signal/communication. In an embodiment, the communication could be a permission for access to control the other vehicle. In another embodiment, the communication could be an incremental control communication, for example, an initial control of the speed up to 10 miles per hour, then further additional 10 miles per hour, and so on.

As a first step of the method according to the disclosure, a data link between the vehicle and nearby vehicle or any other external device is set up in order to permit data to be exchanged between the vehicle and the nearby vehicle or any other external device in the form of a bidirectional communication. This can take place, for example, via a radio link or a data cable. It is therefore possible for the nearby vehicle or any other external device to receive data from the vehicle or for the vehicle to request data from the nearby vehicle or any other external device.

In an embodiment, bidirectional communication comprises the means for data acquisition and are designed to exchange data bidirectionally with one another. In addition, at least the vehicle comprises the logical means for gathering the data and arranging it to a certain protocol based on the receiving entity's protocol.

Initially, a data link for bidirectional communication is set up. The vehicle and the nearby vehicle or any other external device can communicate with one another via this data link and therefore request or exchange data, wherein the data link can be implemented, for example, as a cable link or radio link.

Bidirectional communication has various advantages as described herein. In various embodiments, data is communicated and transferred at a suitable interval, including, for example, 200 millisecond (ms) intervals, 100 ms intervals, 50 ms intervals, 20 ms intervals, 10 ms intervals, or even more frequent and/or in real-time or near real-time, in order to allow a vehicle to respond to, or otherwise react to, data. Bidirectional IR communication may be used to facilitate the data exchange.

The apparatus for the vehicle according to the embodiment that performs bidirectional communication may be by means of a personal area network (PAN) modem. Therefore, a user can have access to an external device using the vehicle information terminal, and can then store, move, and delete the user's desired data.

In an embodiment, the vehicle can transmit a message, a communication, by using any combination of vehicle to vehicle (V2V), vehicle to everything (V2X) or vehicle to infrastructure (V2I) type of communication. In an embodiment, it uses vehicle-to-vehicle (V2V) communication that enables vehicles to wirelessly exchange information (communicate), for example, about their speed, location, and heading.

In an embodiment, messaging protocols comprise at least one of Advanced Message Queuing Protocol (AMQP), Message Queuing Telemetry Transport (MQTT), Simple (or Streaming) Text Oriented Message Protocol (STOMP), MQTT-S (an extension of the open publish/subscribe MQTT), which are heavily used in IoT based technologies and edge networks.

FIG. 15 shows example messages in Dedicated Short-Range Communications (DSRC) message format. FIG. 15 shows: (i) Basic Safety Message (BSM) format: BSM is a fundamental message type in DSRC, used for transmitting information about a vehicle's status, location, and movement to other vehicles in the area. In the example message, the header contains the message ID and protocol version, while the data section contains specific information about the vehicle, such as its ID, speed, heading, and position. The timestamp indicates when the message was generated and can be used by other vehicles to determine the current status of the transmitting vehicle; (ii) Route characteristic (RC) format: It typically includes details such as the starting point, destination, and notable features of the route, such as terrain, road conditions, or any distinctive challenges that may be encountered along the route. (iii) Tire scheme (TS) format: This format includes key components such as pre-trip preparation, adjustments for factors like temperature and altitude changes, handling load variations, routine tire pressure checks, emergency preparedness, and record-keeping. It serves as a guideline to ensure that tire pressure remains at optimal levels to enhance safety, vehicle performance, and fuel efficiency throughout a trip.

An embodiment relates to a method comprising determining a first tire pressure scheme prior to a trip based on tire pressure relevant parameter sets, receiving real-time tire pressure data from a nearby vehicle, determining a second tire pressure scheme based on the real-time tire pressure data, adjusting the first tire pressure scheme to the second tire pressure scheme, and broadcasting an effect of the second tire pressure scheme to the nearby vehicle.

In some embodiments, the method further comprises monitoring a road condition and a weather condition in real time, determining if a tire pressure adjustment is required to achieve a selected control strategy based on the road condition and the weather condition, overriding one of the first tire pressure scheme and the second tire pressure scheme with a third tire pressure scheme based on the selected control strategy. The third tire pressure scheme is calculated by assigning different weights to one or more of tread life, traction, driver comfort, noise, fuel economy, blowout prevention, or an environment condition factor.

An embodiment relates to a non-transitory computer-readable medium for managing tire pressure of a tire associated with a vehicle, the non-transitory computer-readable medium comprising instructions executed to determine a first tire pressure scheme prior to a trip based on a tire pressure affecting parameter, receive real-time tire pressure data from a nearby vehicle, determine a second tire pressure scheme based on the real-time tire pressure data, adjust the first tire pressure scheme to the second tire pressure scheme, and broadcast, via the communication module, an effect of the second tire pressure scheme to the nearby vehicle.

In some embodiments, the non-transitory computer-readable medium further comprises instructions executed to determine if a tire pressure adjustment is required to achieve a selected control strategy based on one or more of a route, a tire condition, available energy source, real-time road condition and real-time weather condition, and override one of the first tire pressure scheme and the second tire pressure scheme with a third tire pressure scheme based on a selected control strategy.

In an embodiment of the system, the system comprises an artificial intelligence (AI) module. The AI-driven system effectively manages tire pressure by both inflating and deflating as needed, based on real-time data and predictive analytics. In some embodiments, the AI module employs various machine learning algorithms to analyze data from sensors, including Decision Trees, Random Forest, and Gradient Boosting, to make informed decisions regarding tire pressure adjustments. In some embodiments, Clustering algorithms, such as K-Means or DBSCAN, help classify the data points into different tire performance clusters. Anomaly detection methods, like Isolation Forest or One-Class SVM, identify unusual tire pressure deviations. In some embodiments, linear or polynomial regression models can be used to predict optimal tire pressure levels based on factors such as vehicle weight, load, and road conditions.

In an embodiment, using historical data on tire pressure and corresponding vehicle performance, supervised learning can train the model to recognize patterns and predict the ideal tire pressure for different scenarios. In another embodiment, the AI module can employ reinforcement learning to interact with the tire pressure system, learning through trial and error which adjustments yield the best results for vehicle performance and tire longevity. In yet another embodiment, Neural networks, particularly convolutional neural networks (CNNs) and recurrent neural networks (RNNs), can be utilized to process sensor data and make real-time adjustments.

In an embodiment of the system, the machine learning model is operable to learn using labelled data using a supervised learning method, wherein the supervised learning method comprises logic using at least one of a decision tree, a logistic regression, a support vector machine, a k-nearest neighbors, a Naïve Bayes, a random forest, a linear regression, a polynomial regression, and a support vector machine for regression.

In an embodiment, the system collects data from various sensors, including pressure sensors, temperature sensors, and accelerometer data. The collected data is preprocessed, including cleaning, scaling, and feature engineering, to make it suitable for analysis. Based on the type of data and problem at hand, the AI module selects the appropriate machine learning models to determine the optimal tire pressure. The AI module continuously monitors tire pressure and other relevant data, identifying patterns and anomalies. The system decides whether to inflate or deflate the tires, taking into account safety, performance, and fuel efficiency considerations. The AI system learns from the consequences of its decisions, refining its model over time to make more accurate predictions and adjustments. In cases where immediate user intervention is required, the system can send alerts or recommendations to the driver or maintenance personnel.

In an embodiment of the system, the machine learning model is operable to learn from the real-time data using an unsupervised learning method, the unsupervised learning method comprises logic using at least one of a k-means clustering, a hierarchical clustering, a hidden Markov model, and an apriori algorithm.

In an embodiment of the system, the machine learning model has a feedback loop, the output from a previous step is fed back to the model in real-time to improve the performance and accuracy of the output of a next step.

In an embodiment of the system, the machine learning model comprises a recurrent neural network model.

In an embodiment of the system, the machine learning model has a feedback loop, the learning is further reinforced with a reward for each true positive of the output of the system.

Figure 16A:
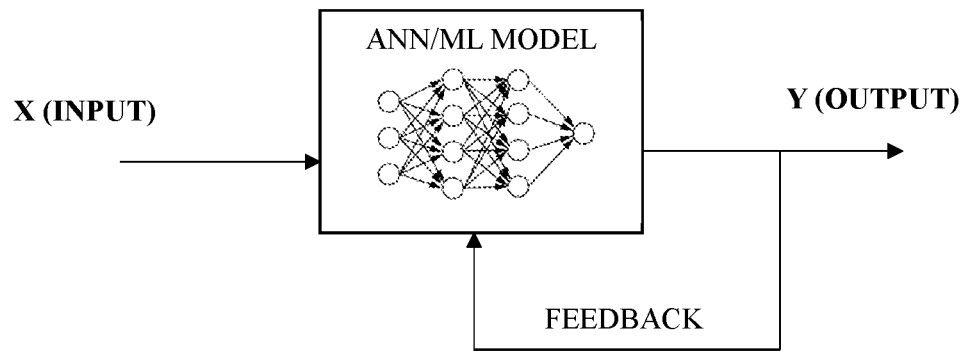
FIG. 16A shows a structure of the neural network/machine learning model with a feedback loop.

FIG. 16A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. The input comprises data sensed by the monitoring module of the system, a driving action by the driver, a tire manufacturing data, a tire-wear condition, and the like. The output layer may predict or detect a pressure change relevant condition, a tire pressure change, a flaw in tire pressure management, an impact of tire pressure management, and a response to change of pressure by the driver and the like (explained above).

In an embodiment, ANNs may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the models' performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (for e.g., tire performance, tire-wear status etc.) are used that are meant for the model to learn. Afterward, the model is tested using unlabelled data. By using, for example, deep learning and neural networks, the model can then make predictions on whether the desired concept/s (for e.g., first tire pressure, second tire pressure, tire pressure scheme, performance, energy efficiency, safety score, to be detected) are in unlabelled images. Each image is given a probability score where higher scores represent a higher level of confidence in the models' predictions. Where a model gives an image a high probability score, it is auto labelled with the predicted concept. However, in the cases where the model returns a low probability score, this input may be sent to a controller (may be a human moderator) which verifies and, as necessary, corrects the result. The human moderator may be used only in exceptional cases. The feedback loop feeds labelled data, auto-labelled or controller-verified, back to the model dynamically and is used as training data so that the system can improve its predictions in real-time and dynamically.

Figure 16B:
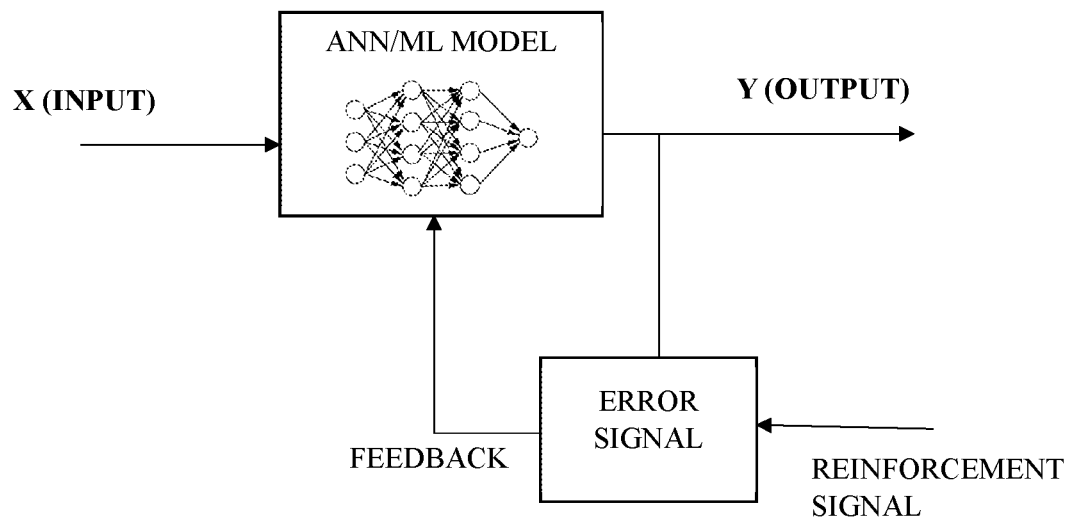
FIG. 16B shows a structure of the neural network/machine learning model with reinforcement learning.

FIG. 16B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

In an embodiment, the system further comprises a cyber security module to prevent any attempt of unauthorized access. The cyber security module comprises an information security management module providing isolation between the communication module and servers.

What is claimed is:

1. A system comprising: a tire pressure control apparatus; a monitoring module, a routing module, and a tire pressure module; and a processor storing instructions in non-transitory memory that, when executed, cause the processor to:
calculate a tire pressure scheme to be utilized by a tire of a vehicle during a trip;
communicate a command to the tire pressure control apparatus to adjust tire pressure of the tire based on the tire pressure scheme;
detect a problem encountered in adjusting the tire pressure of the tire based on the tire pressure scheme;
generate an alert regarding the problem via a driver assistance interface; and
recommend an action to be taken to mitigate the problem.

2. The system of claim 1, wherein the processor is operable to calculate the tire pressures scheme by executing the instructions comprising:
receive a destination location and a driving mode for the trip via a user interface;
determine a route and a driving habit; and
calculate the tire pressures scheme to be utilized during the trip.

3. The system of claim 2, wherein the processor is further operable to:
monitor a road condition in a predefined range; and
modify the tire pressures scheme to a second tire pressure scheme based on the road condition and a selected control strategy.

4. The system of claim 3, wherein the selected control strategy comprises at least one of a energy efficiency, performance, and safety.

5. The system of claim 1, wherein the monitoring module is in communication with a measuring device comprising one or more sensors.

6. The system of claim 5, wherein the one or more sensors comprises a position sensor, an accelerometer, a gyroscope, a magnetometer, a pressure sensor, a temperature sensor, an occupancy sensor, a mass airflow sensor, an engine speed sensor, a spark knock sensor, a coolant sensor, a fuel temperature sensor, a voltage sensor, a camshaft position sensor, a throttle position sensor, a camera, and a microphone.

7. The system of claim 6, wherein the monitoring module is configured to receive vehicle related information from an external computing system, wherein the vehicle information comprises one or more of GPS coordinates, map data, route information, real-time traffic data, vehicle speed, distance to other vehicles, radar or sensor data, vehicle diagnostics, location data, driver behavior information, battery status, voltage, current, temperature, state of charge (SoC), state of health (SoH), and transmission control data.

8. The system of claim 1, wherein the tire pressure scheme comprises a first tire pressure scheme for a first segment of the route, and a second tire pressure scheme for a second segment of the route.

9. The system of claim 1, wherein the processor is operable to modify the tire pressure control apparatus to generate a corrective tire pressure based on an expected road condition of a future location of the vehicle.

10. The system of claim 2, wherein the route is an optimal route comprising one of shortest travel-time, shortest distance, least traffic, and a route which is most frequented by vehicles.

11. The system of claim 1, wherein the processor is further configured to provide reports displayed on a graphical interface located on the vehicle.

12. The system of claim 11, wherein the processor is further configured to transmit at least one of the reports and vehicle data to a remote receiving unit.

13. A method comprising:
   calculating a tire pressure scheme to be utilized during a trip;
   communicating a command to a tire pressure control apparatus to adjust tire pressure of a tire based on the tire pressure scheme;
   detecting a problem encountered in adjusting the tire pressure of the tire based on the tire pressure scheme;
   generating an alert regarding the problem via a driver assistance interface; and
   recommending an action to be taken to mitigate the problem.

14. The method of claim 13, wherein calculating the tire pressures scheme comprises receiving a destination location and a driving mode for the trip via a user interface;
   determining an optimal route and a driving habit; and
   calculating the tire pressures scheme to be utilized during the trip.

15. The method of claim 13, further comprising:
   monitoring a road condition in a predefined range; and
   modifying the tire pressures scheme to a second tire pressure scheme based on the road condition and a selected control strategy.

16. The method of claim 15, wherein the tire pressure is continuously adjusted based on the second tire pressure scheme.

17. The method of claim 16, wherein adjusting the tire pressure comprises deflating the tire.

18. The method of claim 16, wherein adjusting the tire pressure comprises inflating the tire.

19. A non-transitory computer-readable medium for managing tire pressure of a tire associated with a vehicle, the non-transitory computer-readable medium comprising instructions executed to:
   calculate a tire pressure scheme to be utilized during a trip;
   communicate a command to a tire pressure control apparatus to adjust the tire pressure of the tire based on the tire pressure scheme;
   detect a problem encountered in adjusting the tire pressure of the tire based on tire pressure scheme;
   generate an alert regarding the problem via a driver assistance interface; and
   recommend an action to be taken to mitigate the problem.

20. The non-transitory computer-readable medium of claim 19, wherein the non-transitory computer-readable medium further comprising instructions:
   receive a destination location and a driving mode for the trip via a user interface;
   determine an optimal route and a driving habit;
   calculate the tire pressures scheme to be utilized during the trip;
   monitor a road condition in a predefined range; and
   determine a second tire pressure scheme based on the road condition and a selected control strategy.

* * * * *